US007827223B2

(12) United States Patent
Gressel et al.

(10) Patent No.: US 7,827,223 B2
(45) Date of Patent: Nov. 2, 2010

(54) ACCELERATED THROUGHPUT SYNCHRONIZED WORD STREAM CIPHER, MESSAGE AUTHENTICATOR AND ZERO-KNOWLEDGE OUTPUT RANDOM NUMBER GENERATOR

(75) Inventors: Carmi David Gressel, Mobile Post Negev (IL); Michael Slobodkin, Arad (IL); Ran Granot, Yavne (IL); Roy Krotman, Rishon Le Zion (IL); Yehonatan Bick, Kfar Saba (IL); Mark Fiterman, Beer Sheva (IL); Gabriel Vago, London (GB); Amir Ingher, Beer Sheva (IL); Uzi Apple, London (GB)

(73) Assignee: Fortress GB Ltd., London (GB)

( * ) Notice: Subject to any disclaimer, the term of this patent is extended or adjusted under 35 U.S.C. 154(b) by 877 days.

(21) Appl. No.: 11/578,909

(22) PCT Filed: Apr. 21, 2005

(86) PCT No.: PCT/IL2005/000429

§ 371 (c)(1),
(2), (4) Date: Feb. 21, 2007

(87) PCT Pub. No.: WO2005/101975

PCT Pub. Date: Nov. 3, 2005

(65) Prior Publication Data

US 2007/0244951 A1 Oct. 18, 2007

Related U.S. Application Data

(60) Provisional application No. 60/624,463, filed on Nov. 3, 2004, provisional application No. 60/565,304, filed on Apr. 22, 2004.

(51) Int. Cl.
*G06F 7/58* (2006.01)
*H04L 9/00* (2006.01)

(52) U.S. Cl. ...................................... 708/250; 708/252
(58) Field of Classification Search .................. 708/250, 708/252
See application file for complete search history.

(56) References Cited

U.S. PATENT DOCUMENTS 4,852,023 A 7/1989 Lee et al.

(Continued)

OTHER PUBLICATIONS

Maurer, U.M., "A Universal Statistical Test for Random Bit Generators," Journal of Cryptography, vol. 5 No. 2, 1992, pp. 89-106.

(Continued)

*Primary Examiner*—Chuong D Ngo
(74) *Attorney, Agent, or Firm*—Kinney & Lange, P.A.

(57) ABSTRACT

Systems and methods are disclosed, especially designed for very compact hardware implementations, to generate random number strings with a high level of entropy at maximum speed. For immediate deployment of software implementations, certain permutations have been introduced to maintain the same level of unpredictability which is more amenable to hi-level software programming, with a small time loss on hardware execution; typically when hardware devices communicate with software implementations. Particular attention has been paid to maintain maximum correlation immunity, and to maximize non-linearity of the output sequence. Good stream ciphers are based on random generators which have a large number of secured internal binary variables, which lead to the page synchronized stream ciphering. The method for parsed page synchronization which is presented is especially valuable for Internet applications, where occasionally frame sequences are often mixed. The large number of internal variables with fast diffusion of individual bits wherein the masked message is fed back into the machine variables is potentially ideal for message authentication procedures.

13 Claims, 16 Drawing Sheets

U.S. PATENT DOCUMENTS

| | | | |
|---|---|---|---|
| 5,566,099 A * | 10/1996 | Shimada | 708/250 |
| 5,706,218 A | 1/1998 | Hoffman | |
| 6,014,446 A * | 1/2000 | Finkelstein | 380/46 |
| 7,206,797 B2 * | 4/2007 | Gressel et al. | 708/250 |
| 2003/0072059 A1 | 4/2003 | Thomas et al. | |
| 2004/0205095 A1 | 10/2004 | Gressel | |

OTHER PUBLICATIONS

Texas Instrument's OMAP Preliminary User's Manual Security Features, Jan. 2001, particularly Fig. 7-15, "OMAP" p. 7-41.

* cited by examiner

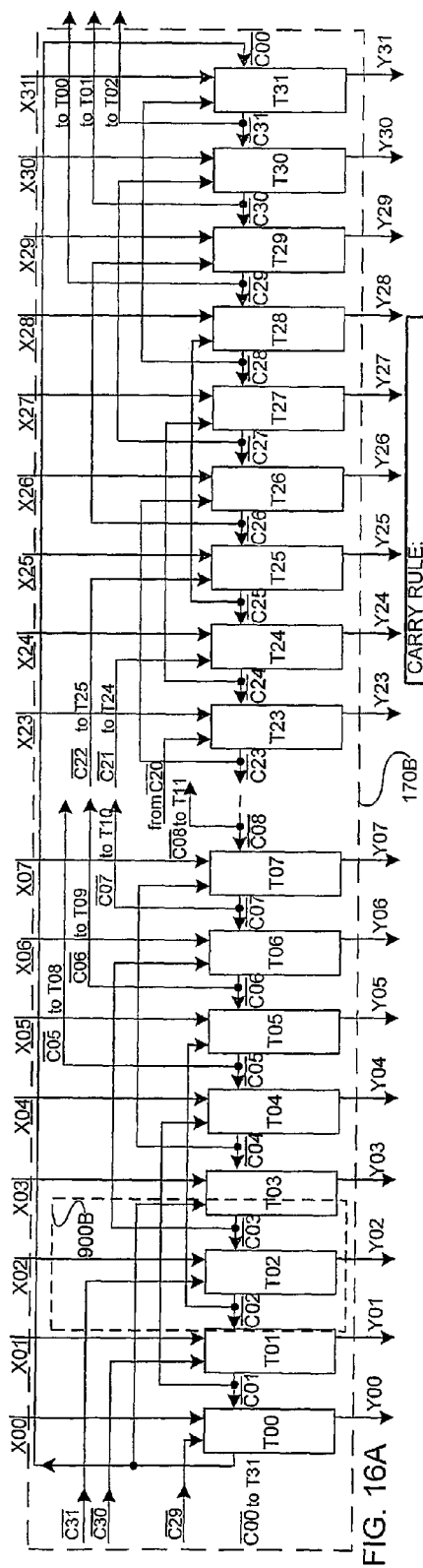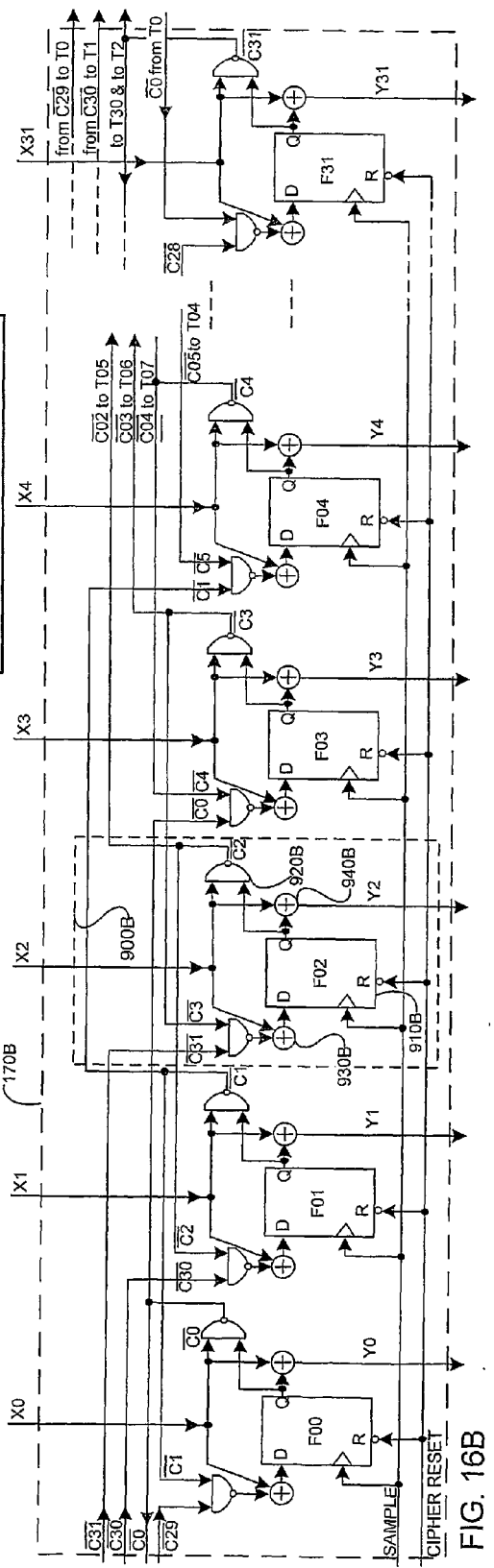
FIG. 16A
FIG. 16B

ACCELERATED THROUGHPUT SYNCHRONIZED WORD STREAM CIPHER, MESSAGE AUTHENTICATOR AND ZERO-KNOWLEDGE OUTPUT RANDOM NUMBER GENERATOR

FIELD OF THE INVENTION

The present invention relates to the field of cryptography, and, in particular random number generation, synchronized stream cipher sequences, and the generation of message authenticating coding.

BACKGROUND OF THE INVENTION

Conventional prior art random number generators, stream ciphers, and message authentication and associated technologies are described in the following documents:
Intel, U.S. Pat. No. 5,706,218, Random Number Generator;
M-Systems, US Patent 2004/0205095, Random Number Slip and Swap Generators;
Maurer, U. M., "A Universal Statistical Test for Random Bit Generators", Journal of Cryptography, Volume 5 Number 2, 1992, pages 89-106, hereinafter "Maurer";
Specification No. TS 102 221 V3.0.0F-06921 published by the European Telecommunications Standards Institute 2000, hereinafter "ETSI";
Texas Instrument's OMAP Preliminary User's Manual Security Features, January 2001, particularly FIG. 7-15, hereinafter "OMAP";
Rueppel, R. A., Analysis and Design of Stream Ciphers, Springer-Verlag, Berlin, 1986, pages 117, 186-187 and 216-218, hereinafter "Rueppel",
The battery of George Marsaglia's latest tests for randomality of generated binary sequences can be found on the following Hong Kong University website: ftp://ftp.csis.hku.hk/pub/random/source, hereinafter, "Marsaglia".

SUMMARY OF THE INVENTION

This invention describes a compact hardware and compatible firmware method for generating quality cryptographic strings of unpredictable binary symbols, i.e., random numbers, with modifications to encrypt binary clear text into cipher text, and to decipher the cipher text with a similar device or firmware emulation thereof; and with further suitable modifications to enable a rigorous method for assuring message authentication, designed to replace present systems which have been successfully attacked and proved inadequate.

The terms random and pseudo-random, or (p)random are used interchangeably, and are often replaced with the words "seemingly random" wherein real random signifies a state of entropy (unpredictability) caused by uncorrelated unpredictable phenomena. Pseudo-randomness signifies a condition wherein a known device with a known initial input has a determined state at a given interval. Real random number generators are typically random non-deterministic devices, driven by a random physical phenomenon. Stream cipher generators are deterministic devices, generating sequences which are generated by a device operative to use a secret key, wherein the output of the device is easily decipherable only by the same or equivalent device operative to use the same secret initializing key. In such transmission, communicant devices, e.g., satellites and ground transmitters, both sender and receiver typically share the same secret key for a cryptographic stream cipher transmission session. In a typical situation, an adversarial or chance observer or testing device cannot differentiate between a random and a pseudo random sequence.

Whether a string of binary bits or words is purely random, colored random, or pseudo random is often philosophical, often ambiguous, and is generally dependent on the observers knowledge of the generating function and the state of the variables. Using the expression, "seemingly random" evades the semantic problem, as a given word variable is pseudo random to a random oracle privileged to know internal secrets, and is conversely unpredictably random to a non-privileged observer, entitled, at most to see a sequence of generated "seemingly" unpredictable words. In many instances it is conventional to use random as a generic description of all "seemingly random" strings, wherein the context defines more accurately the unpredictable status.

INTRODUCTION

There is a stark similarity to the design criteria of a stream cipher and unpredictable random number generator and to Shannon's proof that a "one time pad" is the only perfectly safe encryptor. In the Vernam "one-time pad" cipher, a "securely generated" random number binary key, confidentially kept by the sender and receiver, which is exactly the length of the message is used both to encrypt (by the sender) and to decrypt (by the receiver of the message). Each bit of the key is XORed to clear text data to generate cipher text which is intractably discernable to an observer of the cipher text, as we assume that an adversary could never guess a long random number. As the recipient of the cipher text knows the secret full length "key" used by the enciphering entity, the receiver decrypts the cipher text by using the identical binary sequence which the receiver XORed bit by bit to the cipher text.

The Vernam cipher secret key had to be unpredictable to the most astute observer; the authentic criterion for testing the output of random number generators. It is herein assumed that the ZK-Crypt asymptotically approaches "Vernam" infallibility. In a typically strong system environment, using both the native and generating an obscure extension of the initializing key, working in the most current consuming modes, the user typically confidentially assume that brute force compromising of the key entails large amounts of clear and cipher text Samples from a given session, and well over $2^{190}$ individual trial attacks to divulge the initial conditions. Exhaustive search attacks with a work factor of $2^{120}$ are considered to be intractable with conventional computing, e.g., future attacks may involve quantum or DNA computers.

In conventional cryptography and in the embodiments of this invention, the one-time long length key, is a derivation of a shorter secret key, to generate an encryption key, with a sequence whose length is much longer than the clear text data. The process is typically the fastest method available for encrypting long sequences, e.g., for digitized broadcast television.

It is well known that there is more "local entropy", in Many to One LFSR sequences, (see the Glossary) with more than one pair of taps. The serial outputs of Many to One and One to Many LFSRs are equivalent. To the best of our knowledge, no prior art implementations used all or any of the parallel outputs of One to Many feedback shift registers.

With One to Many FSRs, it is far more obvious that as more XORs are interspersed between cells, the intra-word XORing "scrambles" bits of juxtaposed words (as opposed to the far weaker inter-word changes of Many to One FSRs).

Changing an original Many to One design which was compliant to the NIST test suite when Sampled once every seven primary clocks to the One to Many configuration, produced similar tested results when Sampled once every three primary clocks.

The design criteria for the ZK-Crypt system were very rigorous.

The hardware device had to be:

fast, one clock cycle had to produce one result word for transparent downloading of encrypted digital content over noisy transmission lines, e.g., mobile telephones;

fast for strong message authentication to assure tamper-resistance to stored or transmitted files, financial transactions, long documents, especially to enable booting after quick validation of the operating system;

a very low power consumer, deployable with standard cell semiconductor logic; compact in size, not much larger than an efficient quality random number generator, to be economically feasible for universal inclusion in smart cards, memory controllers, and general purpose CPUs, controllers, and number crunchers;

compatible with the most rigorous tests and rules of compliance for each of the three principal security functions and, not least;

based on an easily recognizable secure architecture, including provable and innovative elements, based on non-esoteric principles to assure early acceptance by cryptographers and standard committees;

an efficient RNG, random number generator; SCE, stream cipher encryptor/decryptor; and not least, a versatile Message Authentication Coder, MAC, to replace the SHA-1 method which is under constant attack.

The firmware implementation had to be available for preliminary:

testing of principals;

generation of test vectors for the hardware implementation;

preparation of drivers for testing modes of use;

re-checking compliance with standards; and not least, to enable immediate distribution for use on existing systems.

The results were gratifying:

At each single stepped clock cycle (after initialization) the device:

outputs 32 bits of stream cipher en/decoded cipher text, or outputs an unpredictable Random Number 32 bit string, or in the first phase digests 32 bits of Message in virtually any length binary file and then Outputs 32 bits of MAC Signature at each clock, wherein;

In the most economic single step mode the unit passes the NIST suite of RNG tests, Marsaglia's DieHard suite, Maurer's suggested tests, and proprietary specific to design tests.

The device is considered Zero-Knowledge, in that an adversary only has access to an output that is "firewall separated" by a hash matrix permutation, four odd-number complementors, at least one correlation immunizing, non-singular maximizing barrier to any of the internal three tiers of non-linear feedback generators, each tier with a pseudo-Brownian reverse orientation correlation and bias elimination permutation combiner, driven by two non-correlated synchronized clocks.

Note that in applications wherein at least one of two communicants executes the ZK-Crypt methods in software, the pseudo-Brownian reverse orientation is typically replaced by simple left or right hand rotations, with the commensurate loss of complexity. (See Rotate and XOR Tier Output Word, in the Glossary.)

The Basic RNG/SCE/MAC Modes of Operation

The ZK-Crypt has one clock input, the Host's (see Glossary) system clock. Typically, it has a second internal optional autonomous oscillator, operative to supply an uncorrelated random source, for RNG applications, unconstrained by ETSI restrictions. Typically, embodiments are activated in the Single Clock Mode, driven by the system clock, only. When the RNG operates in the Single Clock Mode, we say that the hardware is a pseudo-random number generator, where the random source is the secret key (initialized condition); we use the deterministically initialized RNG type outputs in the SCE as the mask for efficient encryption and decryption. (In the RNG dual clock mode, the random sources are the unknown initial state, and the continued randomization caused by the unpredictable pulsing of an autonomous oscillator.)

In the MAC mode, the state of the machine must be a pseudo-random state which is grossly changed by every bit of each successive message word. In the ZK-Crypt the permuted message word is fed back into the Feedback Store, so that previous words affect every eventual message word and every variable in the following states of the machine. The MAC signature is a series of output steps relating to the final state of the ZK-Crypt engine. Six 32 bit words (192 bits) would be a unique sequence representing the status of the six virtually unique words in the ZK-Crypt machine at the last stage of operation.

In all three feedback modes, the ZK-Crypt loads the Feedback Store with relevant MUXed values. In SCE this feedback is not a function of a message word, but typically is the feedback of the encryption mask.

In Single Step economy operation, when at each step only one of three tiers is activated, operation is most efficient and is the fastest and the lowest power consuming, using less than 10% of the current of the 3 tier, 15 Multi-Step operation. Economical operation is of utmost importance in mobile phone and other portable device applications.

In Multi-Step Operation (Encryption, MAC or Random Number Generation), the ZK-Crypt first activates the random clocks a predetermined (the value minus one specified by Sample Delay Vector) number of system clocks to activate nLFSRs prior to sampling an output (while simultaneously activating the Register Bank on the last clock cycle).

In the MAC mode, during the first phase MAC digest, the outputs are fed back into the nLFSR bank; during the second phase output sequence of the authentication coding, the 32 bit signature output strings are down loaded to the host (see glossary).

The following glossary is for reference, as most entries are explained elsewhere in the document. Many explanations are included to help the reader.

| Glossary | |
|---|---|
| Autocorrelation | In the binary sense, a measure of entropy or mutual relationships between two binary strings, wherein a binary n bit "base" string, is replicated typically to double length and the "base" string is "compared" to the longer replicated string, (XORed to the string as it is offset bit-digit by bit-digit), and the number of like (hits) and number of unlike (misses) comparisons is counted at each comparison is recorded). In a perfect n-bit pseudo-random sequence, the number of hits and misses is balanced for all n-bit comparisons, |

-continued

Glossary

| | |
|---|---|
| | except for the single comparison (zero offset) when the string is compared to "itself", when there would be n hits. |
| Biased bits | Seemingly random string generators potentially combine devices and functions which generate specific bits in a string, or possibly all bits in a seemingly random binary string with a predisposition to either one or zero. This patent describes methods to eliminate and/or reduce such predisposition. |
| Binary | A system in which there are only two possibilities. In binary arithmetic, this is defined as arithmetic radix of two, in electronic logic this is defined as binary symbol, 0 or 1. |
| Binary Stream | A bit stream of typically undefined ones and zeroes. |
| Brownian Motion, Pseudo | The ZK-Crypt nLFSRs random strings in a left to right, movement with aberrations occurring when the feedback bit randomly is a one, thereby randomizing the left to right random motion, (because of the value emitting from the MS flip-flop or as a result of a slip pulse or the NOR zero syndrome detector). Experience has shown that if the outputs of the nLFSRs in each tier are XORed and filtered through the Hash Matrix permutation, and at each step (clock) the result is Sampled and tested, the results did not pass the rigorous DieHard test, typically because the tester found a left to right moving correlation. To overcome the left to right detectable movement syndrome, an emulation of a right to left seemingly random pseudo-Brownian bit movement permutation made by making small clusters move forward and backward, where the bits in the cluster move from right to left. Refer to the Top Tier output mapping of FIG. 12. If (1 to 13 bit) random clusters are taken of input X, where the bits in the cluster are reversed their direction, e.g., cluster ($x_{21}$, $x_{22}$, $x_{23}$, $x_{24}$) becomes "mirrored" cluster ($x_{24}$, $x_{23}$, $x_{22}$, $x_{21}$), and these mirrored clusters are disbursed randomly, in Y, a pseudo single direction random Brownian type motion is simulated. In low cost software implementations and lowest power hardware embodiments, the Brownian displacement function is typically disabled, and the Wait and Sample function is enacted wherein nLFSRs are stepped several stages between Samplings. See Rotate and XOR Tier Output Word. |
| Cipher Text | Encrypted data. |
| Clear Text | An unencrypted binary message. |
| Clock | In typical digital systems, a synchronizing binary oscillating signal or the device that generates said signal. Typically, in a device the source is an electronic oscillator that generates periodic signals for synchronization of processes. In typical random number generation embodiments, randomness is typically initiated by simultaneously activating a system clock and a second uncorrelated clock, such that randomizing events typically occur at intractably difficult to estimate intervals. In stream cipher embodiments, there typically is only one clock which deterministically synchronizes the generating stream. In the preferred embodiments of this invention, the primary clock is the single oscillating source. A typical clock cycle occupies a time interval, called a period. Typically, during the first half of the period the clock cycle signal is a stable binary one voltage, and during the second half of the clock period, the voltage is stable at a binary zero voltage level. In the deterministic functions of this document, the pulses of the primary clock are derived from the system clock typically by rules defined by the host computer, and are irregular and are typically not generated in long bursts, regular or irregular. In the methods of this document, a step is equivalent to a single clock signal. |
| Clock Modes, Single/Dual Clock Mode | Two classes of clock modes are demonstrated. A dual clock mode, based on an autonomous oscillator useful for enabling unpredictability to a user who has extensive knowledge of the initial condition of the system, wherein such user has no relevant constraints on temporal current consumption, or is not in danger of generating noise in the specific electronic circuit. The autonomous oscillator is typically activated only when the primary clock is active, in Host defined commands, which typically include single, burst, or free run primary clock activation. The autonomous clock is only activated for random string generation, typically, for establishing initial random string conditions. The autonomous oscillator is activated by the Dual Clock Mode bit. The Single Clock Mode is typically the default mode for RNG, SCE and MAC applications. When only the Single Clock Mode is allowed, the ZK-Crypt mechanism is typically first loaded for RNG and SCE operations with a seemingly random seed, unknown even to the user. Typically, ring oscillators are used as sources for the uncorrelated clocks. In software implementations, there is typically no direct equivalent to an autonomous oscillator. For random number generation, the CPU memory must be programmed to generate a random seed of sufficient length to allay brute force attacks. Real randomness of the RNG seed in the hardware implementation is obtained, typically, by non-deterministic activations caused, typically by Host derived random intervals caused by users' depression of key switches on keypad. A similar strategy is useful in many computer applications wherein at each key switch depression and/or key switch release, the CPU samples a running counter the values of which are concatenated into a random string. |
| Colored Random | An analogy from optics, where the recurrence of patterns or characteristics, typically from a physical random generator, is detectable, e.g., a pattern . . . 0011100111, reappears more often than is normally expected. |
| Collision (MAC) | The unexpected occurrence wherein an altered data file and the original MAC encoded data file have identical signatures. A collision may be accidentally or fraudulently contrived, e.g., a criminal changes the amount of money in a transaction file. Serious collisions have allegedly been found in SHA-1, the NIST Secured Hash Algorithm. In the preferred Message Authentication Coding embodiments, the number of 32 bit digested words is included in the header word, $x_{hdr}$ of the digest, and in the last tail word $x_t$, wherein $x_t$ is generated by the Mask and Page Synch Counter, regulated by a fixed or frozen protocol, to automatically read the Mask and Page Synch, diffusing said count value into the native and obscure variables, thereby limiting the number of the number of collision combinations that an adversary is capable of generating. |
| Complement | In the binary sense, one complements zero, and zero complements one. |
| Confusion | Shannon's original definition of permutation rules, e.g., enciphering transformations that complicate the determination of how the statistics of ciphertext depend on the statistics of plaintext. |
| Correlation | A measure of mutual relationship between two signals, e.g., when one clock is a derivative (e.g., divided by 4) of a second clock, the correlation of one clock to the other is the ratio of the frequencies, 4 to 1. In stream cipher parlance, a nonlinear function F is m-order correlation-immune if the mutual information between the output variable and any subset of m input variables is zero (statistically independent). This is difficult to prove in any particular memoryless function of the ZK-Crypt, even as these functions are driven by non-linear trigger |

-continued

Glossary

| | |
|---|---|
| | functions, and as each tier working separately, without the non-linear combiner with maximum correlation immunizers, passed the DieHard and NIST tests. |
| | Two preferred embodiments of pseudo half and full adder addition (single and double carry saved inputs into each cell of the combiner) ensure maximum non-linearity and correlation immunity. |
| Correlation Immunity | We say that an output is correlation immune, or maximum correlation immune, if no information is leaked from the input (either the stage of an nLFSR or a message word) to the output, either the mask output or to the XORed message to mask output. Rueppel shows that one bit of memory with any non-linear function exhibits both maximum correlation-immunity and maximum non-linear order, if the input has a sensibly chosen uniform distribution. The XOR of the three tiers of nLFSRs, as shown are statistically well balanced, and the mapping of a tier input into a pseudo-Brownian output and subsequent unbiased permutations, ensures unbiased input bits into the non-linear correlation immunizers. Note that in applications wherein at least one of two communicants execute the ZK-Crypt methods in software, the pseudo-Brownian reverse orientation is typically replaced by simple left or right hand rotations, with the commensurate loss of complexity. (See Rotate and XOR Tier Output Word.) |
| CPU, Central Processing Unit | A host device, which typically controls the random generating device or method of preferred embodiments, i.e., defines clock modes, activates generator clocks, commands, and concatenates samplings of the generated seemingly random strings into a larger seemingly random output string. |
| Cryptographic Operations | A term that typically denotes operations including, but not limited to: encryption, decryption, secure hash for message authentication code; and for generating random number sequences. |
| Cycle, Cyclic | Recurrences of same patterns. A clock cycle is typically an interval characterized during the first half of the interval by a one and during the second half of the interval by a zero. Non-extended LFSRs of length n, when activated for $(2^n - 1)$x clock cycles, serially output a string of at least x same binary sequences repeatedly, each of which is $(2^n - 1)$ binary bits long. |
| Data Churn | That part of the ZK-Crypt which processes the XORed output of the three tiers of the Register Bank, see FIG. 2. |
| | The churning operations consist of the Hash Matrix permutations, the ODDN random complements, the Intermediate and the Feedback Combining, and the XOR combing, operative to XOR the output of the Intermediate Combiner with the Message word. |
| Diffusion | The quality of spreading the influence of a single plaintext digit over many ciphertext digits so as to frustrate a piecemeal attack. |
| | Extensive diffusion is especially important when using the MAC function, as the source of diffusion is the message words; i.e., an adverse change of a decimal point or a phrase is typically costly, if a MAC signature is identical for both cases. |
| Displacement | In the context of "slips" in an LFSR sequence of words, the jump of the normal place in the word sequence caused by the complementing of the least significant (LS) bit of the next word to appear in the sequence. For example, in a 5 bit sequence, a one XORed to a zero feed back would displace the word with 0 "left hand" bit with a one bit. |
| | The Hash Permutation, the Brownian permutations, and a simple Rotation of the pairs of nLFSRs affect displacements of input bits. |
| | An alternative to the pseudo Brownian Motion displacement correlation deterrent function, wherein the Brownian displacement routine of each tier is replaced typically by a single, double or triple left hand rotate of the output of the Top, Middle and Bottom Tier, respectively; e.g., the Top Tier is "multiplied by two", (left shifted one bit), and the 00, (MS) bit is "carried into" the LS, ($31^{st}$) bit's location. In such software "friendly" operations, the Hash transformation is redundant. |
| | The advantage of this scheme is the relative ease to execute the transformation in a hardware compliant software application. |
| Entropy | In the random binary string context, a comparative measure of confusion or divergence typically from a predictable sequence, or a part thereof. Simply stated, entropy signifies a degree of "unpredictability". |
| | The accepted mathematical definition grants the same measure of entropy to a random and to a similarly generated pseudorandom sequence. "The probability of finding a particular symbol, times the natural log of that probability, summed over all symbols, and negated. A" is measure of the "uniqueness" of a sequence, measured in bits. Entropy is not the only of measure of randomness. |
| Even Number String ENS | A binary string in a Word consisting of an even number of binary bits, wherein the number of one bits is an even number of bits, and, conversely, the number of zero bits is an even number; e.g., a 32 bit Word with 14 one bits and 18 zero bits in any permutation would classify as an Even Number String. Obviously, one half of the possible $2^{32}$ bit combinations would be classified as Even Number Strings. |
| | If any 32 bit word, X, is permuted into a second 32 bit word, Y, and the result R is X XOR Y, R is always an Even Number String. See Odd Number String, ONS. Each of the Brownian permuted tiers (or even a simple rotational permutation) outputs ENSs only. The transformation of the outputs of each tier is a many to one mapping, conversely the output elements are a subset of all of the typically unbiased outputs of the nLFSR pairs. |
| Exclusive OR, XOR Function | The function symbolized either by an encircled cross $\oplus$, or as a logic gate (and often, when the OR function is not used, simply, a plus sign). Typically, there are two binary inputs to an XOR function. If both inputs are alike, e.g. both are either ones or both are zeroes, a condition defined as a hit, the output is a zero. If both inputs are unlike, e.g. either one and zero, or zero and one, the output is a one, often defined as a miss. In the figures, numeration defines either the gate or the output of the gate. |
| | The abbreviated name XOR and the accepted full name of the XOR logic gate, may be used as transitive verbal participles e.g., exclusive ORing or XORing a one and a zero to output logic one. |
| Exhaustive Search Brute Force | The particular architecture is of a type that is heretofore considered intractable to cryptoanalyze, so that "exhaustive searches" or "brute force" methods are considered to be the only schemes available for prediction. (Remember, there are no proofs that a deterministic cryptographic system cannot be hacked.) |
| | Industry standard strengths of intractability describe a Big O work factor, which says that a constant Big O times an average minimum number of mathematical procedural searches A work factor of $2^{80}$ was considered sufficient in 1996, in 2005 a work factor of $2^{100}$ is considered sufficient, and Diffie estimates that a work factor of $2^{128}$ is sufficient until the advent of flexible quantum computing. |
| Flip-Flop (FF) - Types D, T & SR | An electronic device, capable of maintaining two stable output states, one or zero on outputs Q and Q NOT. Synchronous (clock activated) flip-flops used in the preferred embodiments, are Data (D type) and Toggle (T type). In the D flip-flop, the input at the D connection appearing immediately before an activating clock cycle is Sampled and transferred to the output, Q. In the T type flip-flop, the output is a polarity change from the previous output. When the |

-continued

Glossary

| | |
|---|---|
| | T input is a one, and a clock signal activates the flip-flop, the previous polarities of Q and Q NOT are reversed. Clock activation is typically activated by a rise in the voltage of the clock signal, denoted in the figures by a direct connection of the input to the clock connection; or by the fall in voltage of the input clock signal, typically denoted by a small circle adjacent the connection of the flip-flop. SR flip-flops are asynchronous devices, as they, typically, are activated at random instants, and unsynchronized to a system primary clocking device. An activation voltage on the S input causes a stable one (a set) on the output, Q. Activation of the R input (often marked CLR or Clear), causes a stable zero (a reset) on the output, Q. Flip-flops have an optional second output Q Not, symbolized by a Q under a horizontal dash. A D type flip-flop, with the inverted Q NOT output connected to its D input, toggles the output, at each activating clock signal. D, T and SR flip-flops are used in Stream Ciphers and Random Number Generators. Replication of such devices is immediate in software implementations. |
| Hash Matrix | In this ZK-Crypt, the Hash Matrix is a rule set of 4 permutations of an input signal. In the preferred embodiment the rule is selected by a "juggle toggled" Johnson Counter. The D vector is null vector permutation wherein bits are not displaced. Provision is made, for testing and for enabling efficient software implementations, to lock-in the D vector, as software simulations of the Hash scramble entail inefficient bit orientated operations. |
| Host | The device that controls, reads, synchronizes, Samples, and monitors the output of the stream cipher and random number generator, typically a CPU or a finite state machine with pipelined inputs and outputs for fastest operations. |
| Initial Condition I.C. | The Initial Condition (I.C.) of the ZK-Crypt. This condition is the "key" from which the running key in SCE continues, is a typical random starting condition for RNG generation, and is a publicly known condition for unkeyed MAC. Keyed MAC assumes that the initial condition is confidential. |
| Intractable | In the context of the preferred embodiments, the assumption that accurate estimation or prediction is typically unfeasible using known methods. With 128 bits of native keys, or over 500 state bits, we assume that the compromising the ZK-Crypt is intractable. |
| Inverter logic gate | A logic gate that outputs a signal that is complementary to the input symbol, e.g., a logic one is changed to a zero, and a logic zero is changed to a one. An inverter gate is symbolized by a triangle with the inputs on its base, and a circle on the apex, which denotes the output. |
| Johnson Counter, Juggle Toggled Johnson Counter | Typically, an n bit counter, with n flip-flops, wherein a lone one progresses with a wrap around "right to left" shift. The juggle toggled Johnson counter of the ZK-Crypt progresses both right to left, and left to right, toggled by an internal signal from the (P)Random clock generator. The initial setting of the Johnson counter in SCE and MAC modes of operation is part (2 bits) of the Cipher Control Word. At power-up, typically flip-flops naturally assume a seemingly random state. In those cases where a deterministic secret I.C. is not loaded or preferred, the Johnson counter is typically powered up to a state with more than a lone "1", or possibly in the all zero state. Internal logic forces the counter into the 0001 or 1000 state, respectively. |
| Key, Native, Obscure Running Key | The native keys in the preferred stream cipher embodiments are the initially loaded conditions of the controls and the three tiers (typically loaded by the Host). Obscure keys are contributing memory devices (another almost 70 flip-flops) which are not directly programmable by the host. The stages of the permutation of the embodiments are stages of the running key. |

-continued

Glossary

| | |
|---|---|
| Latch | Typically, a word length string of parallel D type flip-flops, operative to snare and store binary data from a data bus when activated by a signal on the flop-flops' latch-in gates. Latches are implemented in the output ports of the preferred embodiments in this invention. |
| Least Significant, LS and also Most Significant, MS | In normal binary representations, the Least Significant, LS, bit (lowest power bit) is on the right hand side, and the Most Significant, MS, bit (highest power bit) is on the left hand side of the binary word. This orientation is typically not common to counters and shift registers based on flip-flops. Typical circuit diagrams, including binary counters and shift register representations in the literature depict signal inputs with movement oriented from left to right, with the output on the right. In typical descriptions in the literature, and in this document, cells of registers and counters are numerated from left to right, where the LS cell is on the left, and the MS cell on the right. In the tier, counter and shift register representations in this document, the LS bit, denoted the zero bit, is on the left, and the MS bit of an n bit device, denoted the n − 1'th bit of the device is on the right. |
| LFSR | See also Linear Feedback Shift Register and Maximum Length Linear Feedback Shift Register. The LFSR configurations in the preferred embodiments are maximum length configurations. An LFSR is an autonomous logic device, typically having only one binary input, the "clock" or method stepper. |
| Linear Feedback Shift Register - LFSR | A clocked shift register device typically assembled from D type flip-flops with feedbacks taps drawn from defined pairs of flip-flops in the register, or in a second class, with XORs placed between flip-flops of the registers. There are two general classes of LFSRs, One to Many, and Many to One. In a Many to One sequence, outputs from a plurality of taps from a shift register are XORed to the output of the feedback flip-flop which is returned to the input of the first "left hand" flip-flop. In a One to Many configurations, the output of the last flip-flop of the register is fed into specific XOR gates placed between register flip-flops and also fed into the first flip-flop. In the Many to One LFSR configuration, pairs of taps are XORed together, and the pairs, if there is more than one, are again paired, until a single serial feedback signal is input to the "left hand" D-Flip-flop of a right shift register. The LFSR is classed as a linear device, as for each configuration of the LFSR, a given word on the outputs of each of the registers, leads to another defined output of the register, such that the n bit word sequences are cyclically repeated, when the clock is continuously clocked. An all zero word is typically unacceptable sequence in an LFSR configuration, as 0 XOR 0 is equal to zero, and the LFSR is stuck in a sequence syndrome of zero in and zero out. During operation, the only input to an LFSR is the clock or stepper. Knowledge of the fixed configuration of an n bit LFSR, and a one n bit word, typically is sufficient to know another n bit word. Knowledge of a sequence of two consecutive n bit words enables an observer to know both the configuration and the index number of the Sampled words. Different feedback configurations from same length maximum length registers produce all of the same elements of the sequence, but in a different sequential order. In the preferred embodiments, the nLFSRs feeding the Hash Matrix are of the One to Many class. The LFSRs in the Control Units are Many to One feedback shift registers. The One to Many configuration is often referred to in the literature as the Multiple Return Linear Feedback Shift Register. Adjacent stages of One to Many LFSRs appear to have more entropy than adjacent stages of Many to |

-continued

Glossary

| | |
|---|---|
| | One LFSRs, to an observer who has no knowledge of the generating LFSR devices. |
| MAC, Message Authentication Code | A one way function process for converting a large concatenation of binary words into a shorter concatenation of words, a seemingly unique signature on the contents, such that the chance of collision, caused by an adversary or fault, is practically non-existent.<br>The NIST SHA-1, SHS (Secured Hash Standard) generates a 160 bit signature.<br>MAC methods do not inherently guarantee that the signature is a genuine signature. Typically MAC signatures are certified using public key encryption methods. |
| Many to One nLFSR LFSR | The conventional configuration of maximum length feedback registers, wherein pairs of tapped junctions between flip-flops are XORed together to produce the feedback signal. See One to Many nLFSRs. |
| Maximum Length Linear Feedback Shift Register | "Maximum length LFSRs" denotes the class of feedback configurations, where all possible output words, with the exception of the all zero word, are elements of the word sequence of the LFSR. Such LFSRs have desired qualities of randomness, to the observer who has no knowledge of the LFSR logic configuration; hence they are also referred to as pseudo-random or pseudo-noise number generators. |
| Mask | The seemingly random, deterministic, intractably unpredictable output of the intermediate non-linear correlation-immunizing combiner is the mask which encrypts the message word into cipher text when XORed to the plain text message word and decrypts the cipher text when XORed to the cipher text.<br>The Mask is generated by the running key, but is not part of the running key when the device is operated without feedback. In all feedback modes, the Mask is recycled into the Register Bank, and is diffused into subsequent masks. |
| Message | In stream ciphering, the same generated from the secret running key Mask in the first instant of encryption, is XORed to the input plaintext message, thereby encrypting the message word into ciphertext. The decryptor does the identical operation, with its same generated secret running key mask, and thereby decrypts the message word. This is considered a symmetric key operation, as both the encryptor and the decryptor generated an identical mask. |
| Most Significant, MS | See Least Significant |
| Multiplexer | An electronic device with a plurality of binary inputs, each with a defined "address" and a binary "address" input. An addressed binary input is switched to the multiplexed output. |
| Multiple Return nLFSRs | See One to Many nLFSRs |
| Nonlinear Feedback Shift Register-nLFSR | Classes of electronic devices wherein the XORed feedbacks from the shift register do not completely determine the sequence of output words. The non-linear methods used in the preferred embodiments, include a NOR gate to insert a one into the next output word, when all sensed inputs are zero; a "slip" pulse which seemingly at random steps complements a feedback binary symbol, and the many to one pseudo-Brownian permutations. The slip pulse non-linearizes the tiers, as the "slip" is a function of two input AND logic, which causes local complexity in the nLFSR stages, and non-linearity in the stage sequence of the tiers. |
| Non-linear Function, the Non-linear combining correlation immunizing function | The AND function is the simplest non-linear function. Note that the change of a single input into the AND logic gate may or may not change the gate output.<br><br>Examination of the circuitry shows other examples of non-linearity, e.g., when the uncorrelated output of relevant bits of clocks and controls are ORed together, one of the two signals is typically redundant.<br>The Intermediate and Feedback combiners, both with stage memory, and carries achieve maximum non-linearity and also maximum correlation immunity. |
| NOR logic gate | A mnemonic for NOT OR. NOR gates have a plurality of inputs, such that an output of one typically only does not occur if all NOR inputs are at zero. For all other combinations, the output of a NOR gate is zero.<br>The mnemonic NOR may be used as a verbal participle, e.g., NORing inputs A and B to output a one.<br>The NOR gate extension in the LFSRs and NLFSRs in this invention, are operative to induce a zero feedback to form an all zero stage in the shift register, when only the Most Significant bit of the stage of shift register is a one. This addition is also called the de Bruijn sequence, the extended length LFSR, or the proactive solution to the "Stuck on Zero" syndrome, as the NOR gate inserts a one into the feedback when all flip-flops are in a zero binary state. |
| Number, Binary | Any n bit string of binary bits may represent a binary number from zero to $(2^n - 1)$. |
| NXOR, Not XOR | See XOR. |
| Odd Number String, ONS | In an even number of bits string, e.g., a 32 bit word, wherein there is an odd number of one bits, and conversely an odd number of zero bits.<br>Typically, in the preferred embodiments, an ONS is generated when an ENS output from the Hash Permutation Matrix is complemented by one, two, three or four of the ODDN vectors of XOR gates. |
| ODDN, Odd Number Complementors | A cluster of four vectors of XOR gates, each consisting of an odd number of XOR gates, selected randomly by the Tier Select control unit and the Random Clock, operative to randomly complement the outputs of the Hash Matrix. In the preferred embodiments, there is one vector with 13 gates, 2 with 9 gates, and one with a single gate. All combinations are equally probable. |
| One to Many nLFSR | Conventional linear and non-linear feedback shift registers in the literature are configured as many to one feedback shift registers, where pairs of taps are drawn from junctions between flip-flops, and the modulo 2 sum of the outputs serves as the principal feedback into the "left hand" flip-flop. The main drawback to the One to Many configuration is that each stage of the output of the nLFSR or LFSR is a shifted copy (exceptional correlation) of the previous stage, with the exception of the feedback bit into the left hand flip-flop.<br>In the one to many configuration, the XOR gates are inserted between the shift register flip-flops and the feedback bit complements the shifted bits. As in the configurations of the present embodiments, XOR gates are placed at short intervals between flip-flops, a feedback bit of one causes more seemingly random local complexity than the normal many to one shift. Changing an original Many to One design which was compliant to the NIST test suite when Sampled once every seven primary clocks to the One to Many configuration, produced similar tested results when Sampled once every three primary clocks. In all instances, FSR configurations were chosen with a plurality of feedback taps. See FIG. 11.<br>Both configurations are equivalent, if only the single right-hand output bit is Sampled.<br>Altering the feedback with the slip pulse and the NOR gate sensing N − 1 zeroes in the sequence, changes a conventional one to many LFSR into the non-linear feedback configurations of the Register Bank. |
| OR Gate, ORing, ORed | The logic gate operative to output a one if any one of the plurality of inputs is a one, wherein, only an all zero input produces a zero output. The function name of the logic gate may be used as a transitive verbal |

-continued

Glossary

| | |
|---|---|
| | particle, e.g., ORing a zero and a zero to output logic one. |
| Oscillation | In the binary context, the variation between one and zero with respect to time, typically with a quasi-stationary period between changes of polarity. Typically the primary clock is a derivative of the system clock used by the CPU. Typically, an uncorrelated clock is generated by an odd number ring of inverters, defined as a ring oscillator, operative to oscillate at a slowly varying frequency, uncorrelated to the primary clock frequency. The period of a ring oscillator clock cycle is a function of the propagation delays of the inverters. The propagation delays are functions of device temperature and supply voltage. |
| NXOR, Not XOR | See XOR. |
| Page, Page Equality | In normal transmission of data over noisy channels, typically sender and receiver are synchronized at relevant intervals. The intervals whence both sender and receiver, typically, will interrupt the flow of data, will typically be a predefined number of words, which we call a page, and which in some instances may be a frame of data transmitted on the Internet. Typically, at the beginning of a page the sender transmits, and the receiver checks the number in the Synch Counter. In a software transmission, or in an internet transmission where pages typically are not properly decrypted in real time, and or when pages are sent on arbitrary paths, and pages may not be received in the proper sequence, the receiver stores a transmission in memory, in a proper order; to be decrypted at a later instant in time. The Synch Comparator triggers the interrupt when the "Page Equality" designated number of Least Significant bits in the Target Register equals the same Least Significant bits of the Synch Counter. The page size typically are between 4 bits long (16 masks→ 16 × 32 = 512 bits of encrypted data in a page) to 10 bit long (1024 masks → 32 K bits of encrypted data in a page). The Synch Counter is typically connected to a Port in the Host, such that at each page end a transmitter precedes the next page of encrypted data with the total or a portion of the total Word count number in the Synch Counter. |
| Permutation Units | In the preferred embodiments there are two types of displacement permutations and one type of complementary permutations on the outputs of the nLFSRs. The 32 bit outputs of the nLFSR pairs are permuted either by rotation of the nLFSR output or by a pseudo-Brownian permutation. The Hash Matrix permutation is typically, a random choice one of three different displacement combinations or of a "straight through" unaltered passage of the input directly to the output. The four complementary ODDN vectors of XOR gates randomly perform polarity complementation of one of sixteen combinations of from no bit complements to up to a complementation of all 32 bit outputs of the Hash Matrix. |
| Polarity | In a binary device, two poles are valid, zero and one. Changing polarity, means changing a one to zero or a zero to one. Changing polarity of a device is tantamount to toggling a device. |
| Primary Clock (P)Random Clock | The Primary Clock is the only driving step controller in any Single Clock, deterministic mode of operation. In the Dual Clock Mode, all internal signals, and devices with the exception of the autonomous frequency driven signals in the 5 of 6 (P)Random Clock are stepped either by the Primary Clock, or by a derivative of the Primary Clock. In Dual Clock Mode, the autonomous oscillator drives the nLFSRs in the (P)Random Clock. The output of the 5 of 6 (P)Random Clock module is synchronized to the Primary Clock. The (P)Random Clock drives the control units which randomly trigger slip pulses, select Hash |
| | permutations, select ODDN permutations, and select which tiers are activated at a given step. |
| Pseudo-Random | A condition of a binary string resembling randomness to an observer unacquainted with the temporal condition of the generating device, but predictable to an observer who is acquainted with the device, and knows the temporal input and temporal condition of the device. Literally, pseudo randomness describes a collection or array of symbols, which appears to be random, but in fact is not and is predictable by an observer with knowledge of the configuration of the method or device, and the value of the variables at a given step. To allow for inherent ambiguity between pseudo-random and random, this document typically refers to both states as seemingly random, or often as random. |
| Pulse | A short aberration of a quasi-stationary signal, hence, typically, a short interval of one, on a signal that is typically zero. Typically, in these devices, pulses used for activation are synchronized to the primary clock. |
| Random, Pseudo-Random & Seemingly-Random | Typically, a varying state of high entropy and/or a state of difficult to anticipate or predict output values. In practice, a pseudo-random generating device is herein considered a random generating device if the logic values on the plurality of inputs to the device are intractably difficult to predict. To allow for possible ambiguity, in this document, reference is typically made to "seemingly random" bits, words, and sequences or often simply random, in a deterministic function wherein the plurality of internal variables are not known to an observer who senses a "seemingly random" function. Often a signal is truly random in one mode, e.g., RNG; pseudo-random in another, e.g., SCE; and known to the user and/or an adversary who have knowledge of the system and the input, e.g., MAC mode. The reader typically understands the degrees of ambiguity from the context. |
| Random Number Generator, RNG | A Random Number Generator, RNG, is typically a device that generates strings of unpredictable binary bits, which when concatenated into longer strings remain unpredictable, even in those instances where an oracle knows the precise logic implementation (hardware or software). There are many standard tests to judge if a long string is seemingly random, some of which are very demanding; e.g., Marsaglia's Die Hard suite of tests. There is a plurality of analytical tests, wherein the cryptoanalyst knows the internal workings of device, and has a partial result string wherein the analyst is able to define and predict all, or some portions of the next values of the string. Unintegrated segments of the ZK-Crypt have passed DieHard and NIST tests when Sampled at each actuation of a clock. See Exhaustive Search |
| Register Bank, (Non-Linear Feedback Shift Register) nLFSR Register Bank | The Register Bank is the complex of moving feedback shift registers and logic devices of FIG. 2, operative to generate a non-linear input to the Hash Matrix and to generate seemingly random rules to regulate the Hash Matrix and the Odd Number Permutations. The Register Bank consists of three tiers of control units and three tiers of non-linear combinations of feedback shift registers and permutation logic. |
| Register Tier | Typically a 32 cell combination of two juxtaposed nLFSRs operative to output a first 32 bit word which is mapped into a second fixed displacement permutation word, wherein the first and second words are XOR combined at random instants and in the complementary instants only the first word is output from the tier. |
| Rotate and XOR Tier Output Word | An alternative to the pseudo Brownian Motion displacement correlation deterrent function, wherein the Brownian displacement routine of each tier is replaced typically by a single, double or triple left hand rotate of the output of the Top, Middle and |

Glossary (continued)

| Term | Definition |
|---|---|
| | Bottom Tier, respectively; e.g., the Top Tier is "multiplied by two", (left shifted one bit), and the 00, (MS) bit is "carried into" the LS, (31$^{st}$) bit's location. The advantage of this scheme is the relative ease to execute the transformation in a hardware compliant software application. See Brownian Motion. |
| Sample (Function) Internally and Host Initiated | A Sample command received directly from a Host, or derived from a Host command, e.g., Multi-Step Synch to Target, in the preferred embodiments activates an instantaneous processing of the binary contents of the Register Bank and the Data Churn. A sampling procedure occurring at a random instant, uncorrelated to the temporary condition of a pseudorandom device is a random Sample. In the preferred embodiments, a Sample command is operative to XOR the three potentially reduced entropy tiers of nLFSRs, to perform a permutation via the Hash Matrix, to have a seemingly random complement of the Hash output bits, to both store the output of the Hash Matrix in the Intermediate Buffer and to XOR the output of the Hash Matrix, with the previous output of the Hash Matrix, which was stored in the Intermediate Buffer, and XOR this word with the 32 bit Message Word/Random Mask (especially for Stream Cipher encryption and decryption and for MAC validation) and to optionally store either the Mask or the encrypted word in the Feedback Store to modify the contents of the Register Bank in the next step. |
| Seemingly Random | Whether a string of binary bits or words is purely random, colored random, or pseudo random is often philosophical, often ambiguous, and is generally dependent on the observers knowledge of the generating function and the state of the variables. Using the expression, "seemingly random" evades the basic problem, as a given word variable may be pseudo random to a random oracle privileged to know internal secrets, but conversely unpredictably random to a non-privileged observer, entitled, at most to see a sequence of generated seemingly unpredictable words. |
| Shift Register | In a simple shift register or a Many to One shift register, the binary symbol in each flip-flop is transferred to the adjacent flip-flop as is, with the exception of the Most Significant (MS) value which is fed out. In software implementations this is the typically Right Shift command. In the Many to One shift register, at least two outputs are XORed and "fed back" into the Least Significant Flip-flop, typically in a seemingly random sequence. Typically, in hardware implementations a number of concatenated D type flip-flops are connected, typically, with relevant logic between the cells. In the preferred embodiments, both the parallel outputs and the serial outputs are integrated into the final result. At each step of the One to Many LFSR the feedback bit from the MS flip-flop is "multiply returned" to XOR logic gates between adjacent flip-flops, such that a feedback of binary value one will complement the "moving value" between flip-flops, as opposed to Many to One LFSRs wherein such "moving values" are unchanged. The One to Many configurations add to local "confusion". The output may be read as a word, in parallel, or as a serial output, typically from the right hand flip-flop. The sequences of the serial outputs of both LFSR configurations are identical. |
| Significant, Most Significant, MS, Least (LS) Significant | See Least Significant |
| Slip Sequence Function | A function that causes a pseudo-random jump displacement in a conventional LFSR. The slip is from a word in the conventional LFSR sequence to another seemingly random word in the conventional LFSR sequence. XORing a feedback signal with a random pulse of polarity one implements the slip process. This is a random displacement of an n bit output word from one location in the sequence of $2^n$ words to another unique word in the $2^n$ word sequence. |
| Software Embodiment | A preferred mode embodiment of operation of equivalent cryptographic strength is enacted wherein the randomly displaced bit permutations are not activated, e.g., the Pseudo Brownian Auto-XOR and Hash permutations are disabled in a communicating ZK-Crypt device and are replaced by an equivalent entropy operation, wherein the Wait and Sample function is exercised more than one clock cycle between Samples, thereby generating an accelerated software method, typically using byte and word oriented software commands, available on RISC and CISC CPUs, as opposed to bit oriented operations necessary to scramble the Hash Matrix vectors and the Brownian vectors in the normal single step encryption and decryption. For such hybrid software/hardware communications both the hardware device and the software simulating device operate in the Wait and Sample venue. Wait and Sample is less efficient than single step encryption/decryption. (See Rotate and XOR Tier Output Word for a software "friendly" alternative to the Pseudo Brownian Motion displacement function.) |
| Spectrum | A term adopted from optics, where a color in the binary spectrum may typically be a small pattern that is either overly repeated in a long sequence, or inordinately omitted from said sequence. |
| Stream Cipher Encoder, SCE | Stream ciphers are symmetric encryption devices. As defined by Rueppel in Analysis and Design of Stream Ciphers; "stream ciphers divide the plain unencrypted text into characters and encipher each character with a time-varying function whose time-dependency is governed by the internal state of the stream cipher. After each character that is enciphered, the device changes state according to some rule. Therefore, two occurrences of the same plaintext-character will usually not result in the same ciphertext character." In conventional stream ciphers, characters are binary bits, and the time dependency is a function based on a plurality of Many to One type LFSRs, where a combined output of the plurality of LFSRs is XORed bit by bit to a message stream, which is first encrypted by the encryption stream, and subsequently decrypted by XORing each binary bit in another device using the same secret initializing key. In the stream cipher of this invention, the feedback shift registers are non-linear feedback shift registers based on One to Many LFSRs, and the characters are typically 32 bit words. |
| String, Binary and Random | A varied length concatenation of ones and zero bits. |
| Stuck on Zero | The malfunction that occurs in conventional LFSRs, wherein the output of all flip-flops in the shift register are at zero output polarity. With the shift register in such a state, the feedback is "stuck" at zero. The configurations of the nLFSRs in the preferred embodiments prevent the Stuck on Zero syndrome. |
| Synch Counter | In the present invention, the counter that records the number of Sampled words from the first initialized Sample (after the preset variables have been initialized with the secret key, and the other variables have been reset to zero). In preferred embodiments of this invention, the device is operative to initialize itself to a targeted word, by re-initializing the device with the secret key, and activating the device to pseudo-Sample until the device is conditioned to continue sampling from the targeted word. |

Glossary

| | |
|---|---|
| Tier, see Register Tier | The Register Bank's seemingly random output source are the three tiers (Top, Mid and Bot) of concatenated pairs of nLFSRs mapped in a many to one configuration. Attached to each tier's parallel output of concatenated nLFSRs, is a pseudo Brownian reverse direction permuting logic vector, where optionally, the permutation and the concatenation are XORed together to form a seemingly random ENS. See FIGS. 2, 7, and 12. (See Rotate and XOR Tier Output Word for a software "friendly" alternative to the Pseudo Brownian Motion displacement function.) |
| Tier Combiner, 3 Tier Combiner | In the preferred embodiment, the word outputs of the three tiers are XORed together into a combined output. |
| Toggle | A complementary change of a binary signal, i.e., a change of a one to a zero or a change of a zero to one. |
| Uncorrelated clock frequencies | Typically a condition wherein the least common denominator of two clock frequencies is the integer, one. |
| Variables, Native Obscure & Public | The native variables consist of those values that are directly loaded by the host into the 128 flip-flops in the Register Bank and the Cipher Control word. When operated in a Feedback Mode, the 64 flip-flops in the Intermediate Store and the Feedback Store can assume secret, non-observable values. In addition, 3 flip-flops in the (P)Random Clock generator, 1 flip-flop each in the Top, Mid and Bot Control units, bring the total to 198 secret key binary variables. Public Variables include the 32 bit Synch Target Variable, the Synch Counter value, and the Sample Delay Vector. See keys. |
| Word | A defined length of a binary string. Typically, the length of a word is longer than one byte. In a preferred embodiment the word length is 32 bits. |
| Work Factor | The number of computational trials using a given method, necessary, on the average to compromise a cryptographic process. A work factor of at least $2^{100}$ trials is generally considered sufficient. Compromising Single DES on random data, using brute force guessing, has an average work factor of $2^{55}$. |
| XOR | Abbreviation for Exclusive OR. Typically, in hardware devices a 2 input logic gate used in modulo 2 arithmetic. For the two input XOR gate, an input of same polarity inputs is operative to output a zero; and for either combination [(0, 1) and (1, 0)] of one and zero, the XOR function outputs a one. For a single bit output XOR function with a plurality of inputs, the output is a one, if the number of "one" inputs is odd; else the output is zero. XOR gates are depicted typically as encircled crosses, or as conventional twos complement gates. In GF(2)logic equations, XOR is conventionally symbolized with the plus sign, +. The capitalized abbreviation XOR is used as a transitive verbal participle, e.g., A is XORed to B; and as a primitive logic function, e.g., 1 XOR 0 = 1. In hardware implementations, as in software methods, XORing a word defines bit wise XORing of all same position bits in two XORed words operative to generate an output word. NXOR is the abbreviation of NOT XOR, and is the complement of XOR. Conventional implementations of XOR and NXOR use the same number of transistors. |
| Zero-Knowledge, Z-K | In the preferred embodiments of this invention, a condition wherein knowledge of the output sequence of the device typically grants no knowledge of the binary status of any of the internal variables in the device. It is to be noted that the three principal ZK-Crypt functions, RNG, SCE and MAC are similar, and many instances two of the three are configured. The RNG may be configured identically to the SCE encryption mode, wherein an uncorrelated message word in the RNG mode typically adds complexity to the result. Both RNG and SCE may be configured in a Feedback Mode, wherein the Mask Word (RNG Output) may typically be fed back into the Register Bank. Similarly, the RNG and the MAC digest can be configured identically, where the Message word is included in the Feedback. |
| ZK-Crypt | The abbreviated name of both the Hardware and Software implementations of the herein described method and device, operative to generate Random Number Words and Sequences, to encrypt and decrypt streams of binary words, and to validate the unaltered status of a stream or file of binary data. |

LFSR Basic Configurations

There are two basic configurations of linear feedback shift registers (LFSRs), the Many to One configuration, where pairs of flip-flop outputs are XORed to generate a single bit of feedback to the input in the first flip-flop of the register, and the One to Many configuration, wherein the binary output simultaneously XORs the same pairs of flip-flops. The serial outputs of the two types of shift registers are identical "pseudo-random" sequences. The sequence of n-bit words at each clock shift of the Many to One type "looks" to the chance observer to be an extremely regular (low entropy) listing of ones and zeroes, where n−1 bits of the last word are simply shifted "en masse" to an adjacent position, whereas in the One to Many sequence, the listing of words is typically jumbled. In the One to Many configuration, (also called the multiple return configuration) whenever the feedback bit is a binary "1" many of the shifted bits in the next word are complemented. (In the preferred register bank embodiments, there are a minimum of six complemented bits in every multiple return nLFSR.)

Clock Modes and Initial Conditions

In single clock mode, the primary clock is typically the oscillating source of the randomizing clock. When operating as a random number generator in single clock mode, unpredictable inputs generated during the initialization and "re-initialization" procedures cause the unit to "take on" an unpredictable condition capable of producing a binary stream which is typically unpredictable. In a unit which does not employ a second uncorrelated oscillator, an unpredictable initial condition can typically be achieved by activating individual tiers of nLFSRs for the unpredictable intervals when key switches in keypads are closed; typically in mobile phones and remote television controllers. In devices, e.g., wireless communication devices, wherein an uncorrelated oscillator interferes with normal communications, an unpredictable initial condition necessary for obtaining random word sequences can be obtained by operating the generator in dual clock mode prior to inaugurating sampling random words. In dual clock mode, an autonomous, typically ring, oscillator actuates the randomizing clock for a reasonable interval, and subsequently causes an unpredictable initial condition, a prerequisite for random number generators.

In the single clock deterministic mode, an adversary who knows an exact equivalent of the ZK-Crypt device, could conduct an exhaustive search of all initial conditions, enabling such an adversary to be able to "impersonate" a valid owner of the a single secret key. Industry standards identify a work factor to mean the average number of trials necessary for an adversary to execute in order to break a particular code.

As proper use of stream ciphers entails establishing a new seemingly random secret key for each session, the exhaustive search is not the most cost effective or quickest way to compromise such a cipher. In the described preferred embodiment, there are 128 directly programmable initial condition flip-flops, the native key, and another 70 extension programmable flip-flops, the obscure initial condition key. Typically, the adversary must know the initialization value of each flip-flop variable (or the firmware equivalent); in order to recreate a proper output sequence.

When operated as a stream cipher, typically, a new 128 bit random number "secret session key" will be generated, and encrypted, typically with a user's public asymmetric key to be part of the header of the encrypted file or with a derived key which is a known function of the base secret key.

When the encryption is part of a large file, the option of insuring page and mask synchronization is increasingly important as loss of page synchronization is tantamount to error propagation in all conventional chained block encryption methods, e.g., DES. In the 32 bit Synch & Page Target Register, a target address is loaded. The least significant 4 to 10 Page Equality bits of the target address signify if and when an interrupt signal will flag the host, to program a transmission. At each sampling of the Intermediate Correlation Immunizer, the Mask Synch & Page Counter is incremented.

Interrupts

Two interrupt signals are generated by the Equality Logic Array, (a double comparator). The 3 bit Page Equality (Select) signifies how many LS bits of the Mask Synch & Page Counter are to be compared to the target address to trigger an interrupt. The page interrupt typically serves to insert the present Mask Synch & Page Count number into the header of a transmitted packet, to aid the receiver to synchronize packets (pages), as in long Internet transmissions, packets traveling separate routes are often not received in the proper sequence.

A "Target" interrupt is issued when the Mask Synch & Page Counter and the Synch & Page Target Register values are equal. Typically, this is used with one of the Synch to Target commands, which prepare an encryption mask for decrypting from an intermediate point of a long file.

Bias and Aberrations

Experience has shown that single and multiple bit biased aberrations of nLFSRs unexpectedly occur, as all stages and all individual bits of an LFSR are intuitively unbiased. All seemingly unbiased output bits of all nLFSRs in all three tiers, are XORed to at least three other seemingly unbiased variables. This guarantees reasonably close to zero bias for all random strings.

With good reason, it can be assumed that few nLFSR bits will be biased. In the following exaggerated example, two input to XOR bits are both heavily biased. If biases are binary mirror symmetric (one bit is heavily biased to "1", and the complement bit is heavily biased to zero), the statistics are complementary.

The first example shows how three stages of XORing of two unlikely biased bits, the final result statistic is free of bias. The second example shows that if only one bit of the pair is biased, the result bit is unbiased.

A (0.7 to 0.3) biased to zero x'th bit with output improved by XORing-

| The 4-$x_i$ $\oplus x_j$ Samples | Probability of i'th input | Probability of j'th input | Output Bit$_i \oplus$ Bit$_j$ | Probability of a "0" Output | Probability of a "1" Output |
|---|---|---|---|---|---|
| 0 $\oplus$ 0 | 0.7 | 0.7 | 0 | 49% | |
| 0 $\oplus$ 1 | 0.7 | 0.3 | 1 | | 21% |
| 1 $\oplus$ 0 | 0.3 | 0.7 | 1 | | 21% |
| 1 $\oplus$ 1 | 0.3 | 0.3 | 0 | 9% | |

Average XORed output x'th bit—58% "0"s to 42% "1"s, a 60% reduction of bias.

Where the previous result biased bits are again XORed-

| The 4-$x_i$ $\oplus x_j$ Samples | Probability of i'th input | Probability of j'th input | Output Bit$_i \oplus$ Bit$_j$ | Probability of a "0" Output | Probability of a "1" Output |
|---|---|---|---|---|---|
| 0 $\oplus$ 0 | 0.58 | 0.58 | 0 | 33.6% | |
| 0 $\oplus$ 1 | 0.58 | 0.42 | 1 | | 24.4% |
| 1 $\oplus$ 0 | 0.42 | 0.58 | 1 | | 24.4% |
| 1 $\oplus$ 1 | 0.42 | 0.42 | 0 | 17.6% | |

Average XORed output x'th bit—51.2% "0"s to 48.8% "1"s an 85% reduction of bias.

and after at least one more serial XOR of the resulting bits-

| The 4-$x_i$ $\oplus x_j$ Samples | Probability of i'th input | Probability of j'th input | Output Bit$_i \oplus$ Bit$_j$ | Probability of a "0" Output | Probability of a "1" Output |
|---|---|---|---|---|---|
| 0 $\oplus$ 0 | 0.512 | 0.512 | 0 | 26.2% | |
| 0 $\oplus$ 1 | 0.512 | 0.488 | 1 | | 25% |
| 1 $\oplus$ 0 | 0.488 | 0.512 | 1 | | 25% |
| 1 $\oplus$ 1 | 0.488 | 0.488 | 0 | 23.8% | |

Average XORed output x'th bit—50% "0"s to 50% "1"s, miniscule bias—close to 100% removal of sensed bias for what might be considered an impossible FSR output.

Example of a biased bit XORed to an unbiased bit.

| The 4-$x_i$ $\oplus x_j$ Samples | Probability of i'th input | Probability of j'th input | Output Bit$_i \oplus$ Bit$_j$ | Probability of a "0" Output | Probability of a "1" Output |
|---|---|---|---|---|---|
| 0 $\oplus$ 0 | 0.7 | 0.5 | 0 | 35% | |
| 0 $\oplus$ 1 | 0.7 | 0.5 | 1 | | 35% |
| 1 $\oplus$ 0 | 0.3 | 0.5 | 1 | | 15% |
| 1 $\oplus$ 1 | 0.3 | 0.5 | 0 | 15% | |

Average XORed output bit—50% "0"s to 50% "1"s

Showing that XORing an unbiased bit with a biased bit results in an unbiased output.

Proof: For a bias of $\epsilon$, where one polarity, e.g., 0, has a probability of $0.5+\epsilon$, the complement polarity would then be $0.5-\epsilon$, where $\epsilon \ll 0.5$.

First polarity, e.g., "0", output for 0⊕0 and 1⊕1, would be the sum of a) and b):

$$(0.5+\epsilon)(0.5+\epsilon)=0.5^2+\epsilon+\epsilon^2 \quad \text{a)}$$

$$(0.5-\epsilon)(0.5-\epsilon)=0.5^2-\epsilon+\epsilon^2 \quad \text{b)}$$

with an average bias of $0.5+2\epsilon^2$. As $\epsilon<<0.5$, $2\epsilon^2<<\epsilon$, for $\epsilon=0.02$ (a huge bias), $2\epsilon^2=0.0008<<0.02$. (Note, $\epsilon$ is by definition less than 0.5, as 0.5+0.5 defines a probability of one, and there can only be a single polarity, "1" or "0".)

Loss of Entropy with the Pseudo-Brownian Permutation or Simple Rotate and XOR Permutations There is a small loss of entropy when a proper permutation of a random binary string is XORed to itself. The input into the pseudo-Brownian Auto-XOR is the present value of the tiers two nLFSRs. Minimally, there are two seemingly uncorrelated inputs for each possible auto-XORed outputs; e.g., a two to one mapping. Suitable displacement vectors can be constructed to cause 2, 4, 8 and even 16 to one mapping.

The contrived displacement vectors of this invention are rotated versions of the same "Brownian" orientation is used on all three tiers. The XORed result of the three tiers we consider to be a correlation resistant non-linear summation which, assuming that the nLFSRs can assume any value, the result is one of $2^{32}/2$ seemingly colored random values, with the single constraint that the number of ones is even, e.g., in the 32 bit string there are 0, 2, 4, 6, . . . 30, 32 ones and 32, 30, . . . 6, 4, 2, 0 zeroes respectively. The "color" is removed subsequent to the Hash Permutation by the ODDN complementors.

The Brownian auto-XOR mapping reduces the necessary number of three clock activations of the three tiers between samplings to the present economical single clock activation where only one seemingly random tier is activated at each sampling.

In a binary string with an even number of binary bits; the result of XORing the original string with any permutation of the original string will always result in a third string which will have an even number of ones and an even number of zeroes. We call these output strings, "even numbered strings", ENSs, and note that $ENS_i$ XORed to $ENS_j$ produces $ENS_k$, a third "even numbered string". As all three tier outputs are ENSs, albeit each with a reduced different combination of possible outputs, then the input to the Hash Permutation Matrix is also an ENS. Though such strings passed DieHard and NIST, as will be seen in the Hash Matrix section, we randomly complement an odd number of the ENS bits to produce ONSs, "Odd Number Strings". Duality exists with the normal exclusive OR function, e.g., $ENS_i$XOR $ONS_j=ONS_k$ and $ONS_i$XOR $ONS_j=ENS_k$.

Two pseudo-Brownian vectors of the three Brownian displacement vectors, when XORed to the tier nLFSR pair concatenation output create a two to one mapping, i.e., each of the $2^{31}$ outputs is an ENS, and all ENSs appear twice, when the full $2^{32}$ word sequence is generated.

The TOP Tier Reversed Pseudo-Brownian Motion bit permutation vector is a two to one mapping:

a) 19, 18, 17, 16, 15, 14, 13, 12, 31, 30, 29, 28, 27, 26, 25, 11, 10, 9, 8, 7, 6, 5, 4, 3, 2, 1, 0, 23, 22, 21, 20, 24.

The MIDDLE Tier Reversed Pseudo-Brownian Motion bit permutation vector is also a two to one mapping:

b) 20, 24, 19, 18, 17, 16, 15, 14, 13, 12, 31, 30, 29, 28, 27, 26, 25, 11, 10, 9, 8, 7, 6, 5, 4, 3, 2, 1, 0, 23, 22, 21;

The BOTTOM Tier Reversed Pseudo-Brownian Motion bit permutation vector is a four to one mapping:

c) 24, 19, 18, 17, 16, 15, 14, 13, 12, 31, 30, 29, 28, 27, 26, 25, 11, 10, 9, 8, 7, 6, 5, 4, 3, 2, 1, 0, 23, 22, 21, 20.

Similarly, a single or triple right or left hand rotate maps into a 2 to one mapping, a double rotate, maps into a 4 to one mapping, and a quadruple right or left hand rotation maps into a 16 to one mapping.

Sources of Uncertainty

The sources of uncertainty of the output of the ZK-Crypt include:

1) A missing pulse randomizing clock operative to cause uncolored random trauma to nLFSR sequences with an average aggregate frequency of more than ⅝ of the primary clock frequency.

2) The randomizing clock when activated by the primary clock, synchronized to the system clock issues a synchronized stream with "missing" pulses. In a preferred embodiment, the stream is driven by inputs from the mechanism that detects n−1 zeroes in each of the 6 unique nLFSRs, (n=13, 14, 15, 17, 18, and 19), and the feedback outputs from the 17 and 13 bit nLFSR. In the randomizing clock, two "many to one" LFSRs transform these aberrations into a colored pseudo-random output sequence, where the probability of an output pulse being a one is approximately 0.841.

3) The three control units which are driven by the randomizing clock, operative to transmit seemingly random pulses, to randomly selected ODDN XOR switches and configuration signals to the tier select and clock control. Aberrations of the control sequences are driven by internally generated random inputs to the seemingly random counter that defines when the slips and configuration changes occur; and also aberrations by feedback bits from all six nLFSRs; and an internal pseudorandom LFSR that defines via the slip encoder which nLFSRs endure a slip displacement.

4) Each nLFSR progresses from one pseudo-random stage to the next stage, where the sequence is aberrated by a maximum feedback length One to Many feedback configuration where at least six flip-flop outputs mutate the shifted bits, when a feedback signal $F_B$ is a "1". The nLFSRs are non-linear in the sense that the stage in a sequences is randomly changed by slip pulses occurring at uncorrelated instants and by a sensor that inserts an all zero word into the set of $2^n$ possible words of each nLFSR where the three aberrating signals are XORed together in the feedback.

5) When in a feedback mode, a non-linearized, correlation immunized previous word result is fed back into the three tiers (all of the nLFSRs). Only tiers which are activated are affected by the instantaneous feedback. There is a maximum current consumption option, where all three tiers are activated at each Sample. The feedback mode is mandatory, only for message authentication signatures.

6) When Sampled, the output, $X_i$ of each tier is scrambled into a pseudo-Brownian word, $X_j$, and the two words are XORed to produce an output word, $Y$, the bits of which are reasonably assumed to be unbiased and less correlated to the original $X_i$. (See Rotate and XOR Tier Output Word for a software "friendly" alternative to the Pseudo Brownian Motion displacement function.)

7) At each sampling, the output of the three tiers is XORed into a single word, regardless if an individual tier is or isn't activated at the sampling cycle.

8) The result 32 bit word of the three tiered XOR is, in a preferred embodiment, input into a hash matrix, operative to scramble (hash) the bit placement of the output word. In a preferred embodiment, the matrix consists of four permutations. The matrix vector permutation selector is a randomly juggled 4 bit Johnson Counter.

9) The output of the hash matrix is modified randomly by one of 16 combinations of seemingly random vector odd numbers of XOR gates (ODDN filter) which complement randomly selected bits of the Hash Matrix output.

10) The output of the ODDN filter is input into the Correlation Immunizing Intermediate Store and Hi-Level non-Linear Combiner of the two last inputs.

11) The Stream Cipher Pseudorandom Encryption Mask is XORed to the Message word (either plain text to be enciphered, or cipher text to be deciphered).

12) A second Correlation Immunizing Store and Hi-Level non-Linear Combiner accepts an input word (typically, the encryption mask for RNG and SCE modes) when in Feedback mode, wherein such correlation immunized word is fed back to the three tier inputs.

The method of this invention is implemented in hardware and software, wherein software solutions are compatible but less time and energy efficient than the hardware depicted in the drawings.

BRIEF DESCRIPTION OF THE DRAWINGS

The present invention is described in conjunction with the drawings in which:

FIG. 15A and FIG. 16A are block diagrams depicting correlating immunizing and non-linearizing combiners, with memory and pseudo carry interactions. These combiners serve as the RNG output and the Mask for SCE, and also as the Feedback store, principally for the MAC.

FIGS. 15B and 16B depict preferred circuit embodiments of FIGS. 15A and 16A.

DETAILED DESCRIPTION OF THE PREFERRED EMBODIMENTS

Commands

In the preferred embodiments as illustrated in FIGS. 1 to 16, the following commands, interrupts and data input and output are operative to execute the variety of modes of random number generation, stream ciphering and message authentication coding, RNG, SCE and MAC, respectively.

Figure 7:
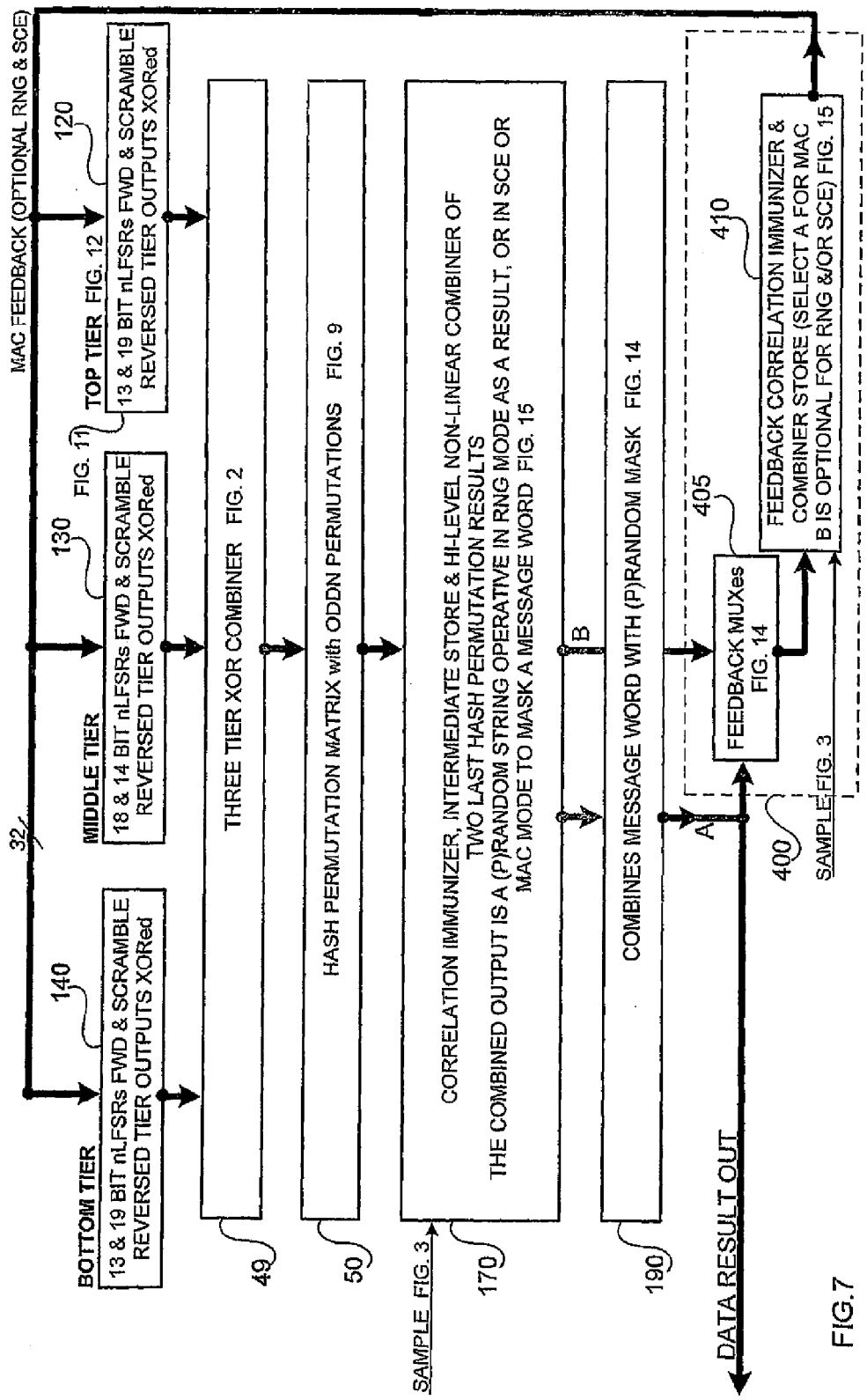
FIG. 7 is a simplified diagram of the data processing modules driven by control devices of FIGS. 3, 4, 5, and 6.
Figure 8:
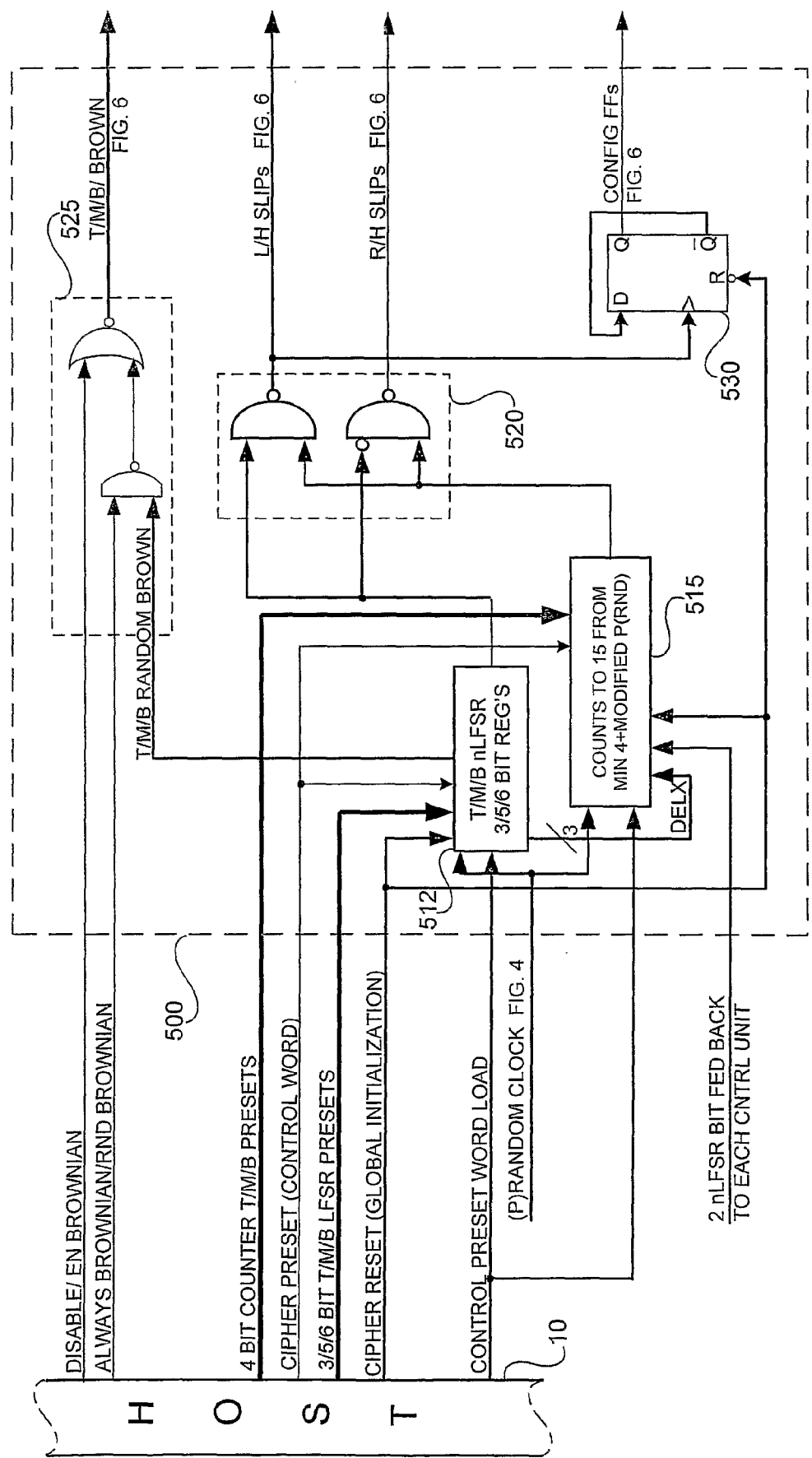
FIG. 8 is a simplified functional block diagram describing the Top, Middle and Bottom control units, operative to drive the tier selects and clock control, the ODDN switches, and the slip encoder of FIG. 6.

| | |
|---|---|
| Always Brownian/ Rnd Brownian FIG. 8 | With Brownian Dis/En enabled and Always Brownian the output of all 3 tiers auto-XORs the Brownian displacement vectors with the nLFSR vector. (See Rotate and XOR Tier Output Word for a software "friendly" alternative to the Pseudo Brownian Motion displacement vector.) |
| Brownian Controls FIGS. 2, 6 | See Always Brownian and Disable/Enable Brownian. (In software "friendly" applications, the Brownian Displacement is typically replaced by a rotational displacement.) |
| Cipher Reset FIGS. 2, 3, 4, 5, 6, 8, 11 | An asynchronous command used prior to loading the Initial Condition variables for Stream Ciphering or Message Authentication. All variables must be Set to the initial nil condition. Typically, this is the initial condition for Message Authentication. |
| Cipher Preset FIGS. 2, 3, 6, 8 | A double step synchronous command which follows Cipher Preset and subsequent Host loading of all ZK-Loadable secret and non-secret variables (which typically includes an initial Message Word). Cipher Preset loads the counter for the Wait and Sample sequence (even if not used) and inserts a first value, derived from the Register Bank in the Intermediate Store, and the Feedback Store (if enabled). |
| Crypto-Message In FIGS. 1, 2 | In a preferred embodiment a 32 bit message word. In a typical hardware implementation the Message Word resides in an output port of the Host during the interval when the Sample Command is activated. |
| Data Result Out FIGS. 1, 2, 7, 14 | In Single and Multi-Step RNG/SCE/MAC operation the host reads the relevant results after the Sample Step. In a typical hardware implementation, this value resides on a Host input port and is not latched in the ZK-Crypt. |
| Disable Brownian/ Enable Brownian FIG. 8 | For testing, for compliance with a software device and for users' demanding low current consumption, the option exists to disable the Brownian displacement vector auto-XOR. This is not advisable, as there is virtually no loss of entropy, and any long term bias on any bit within the tier is |

Figure 2:
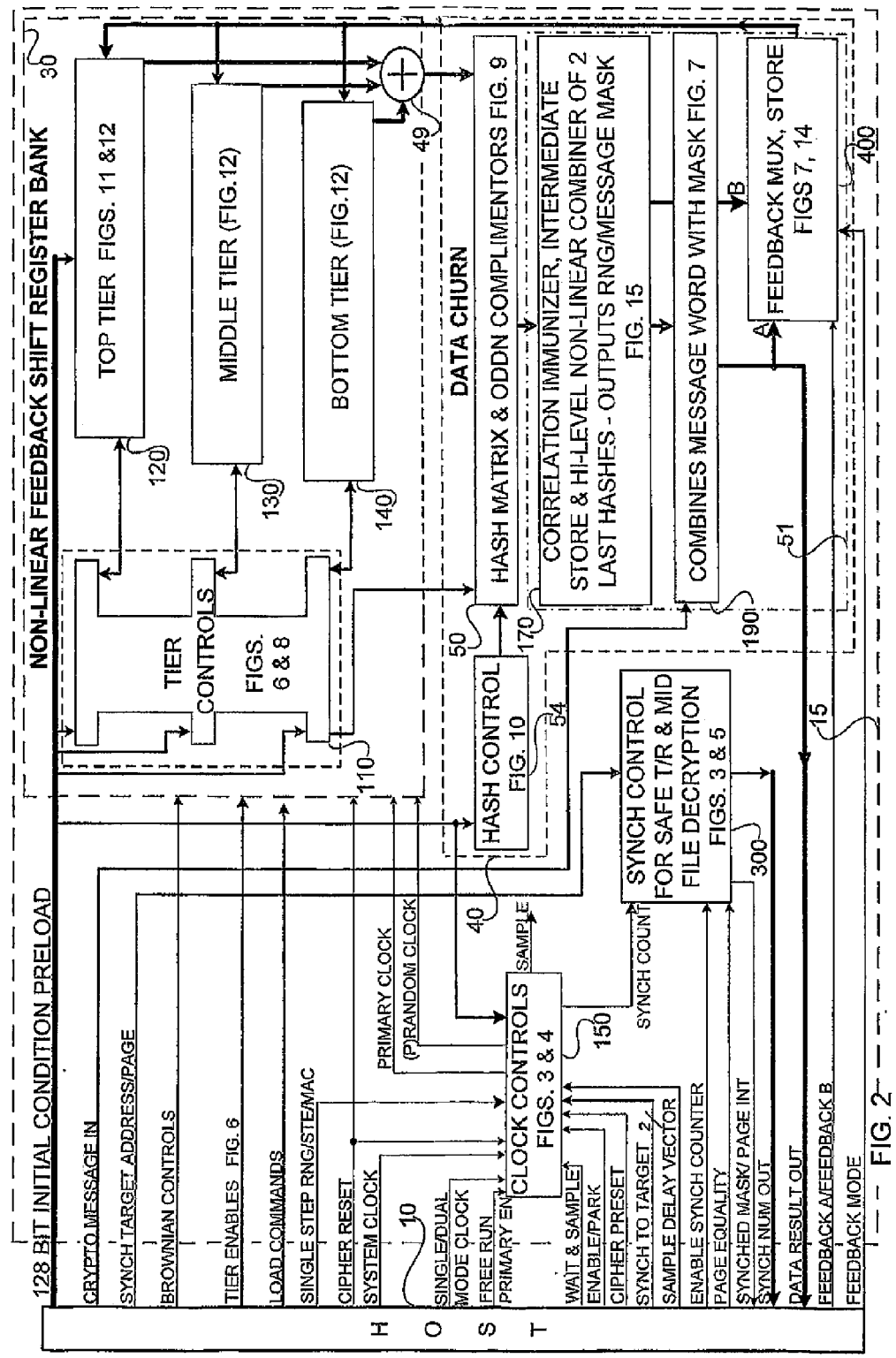
FIG. 2 is a more detailed functional block diagram, showing essential input/outputs to the ZK-Crypt from a computerized Host.
Figure 3:
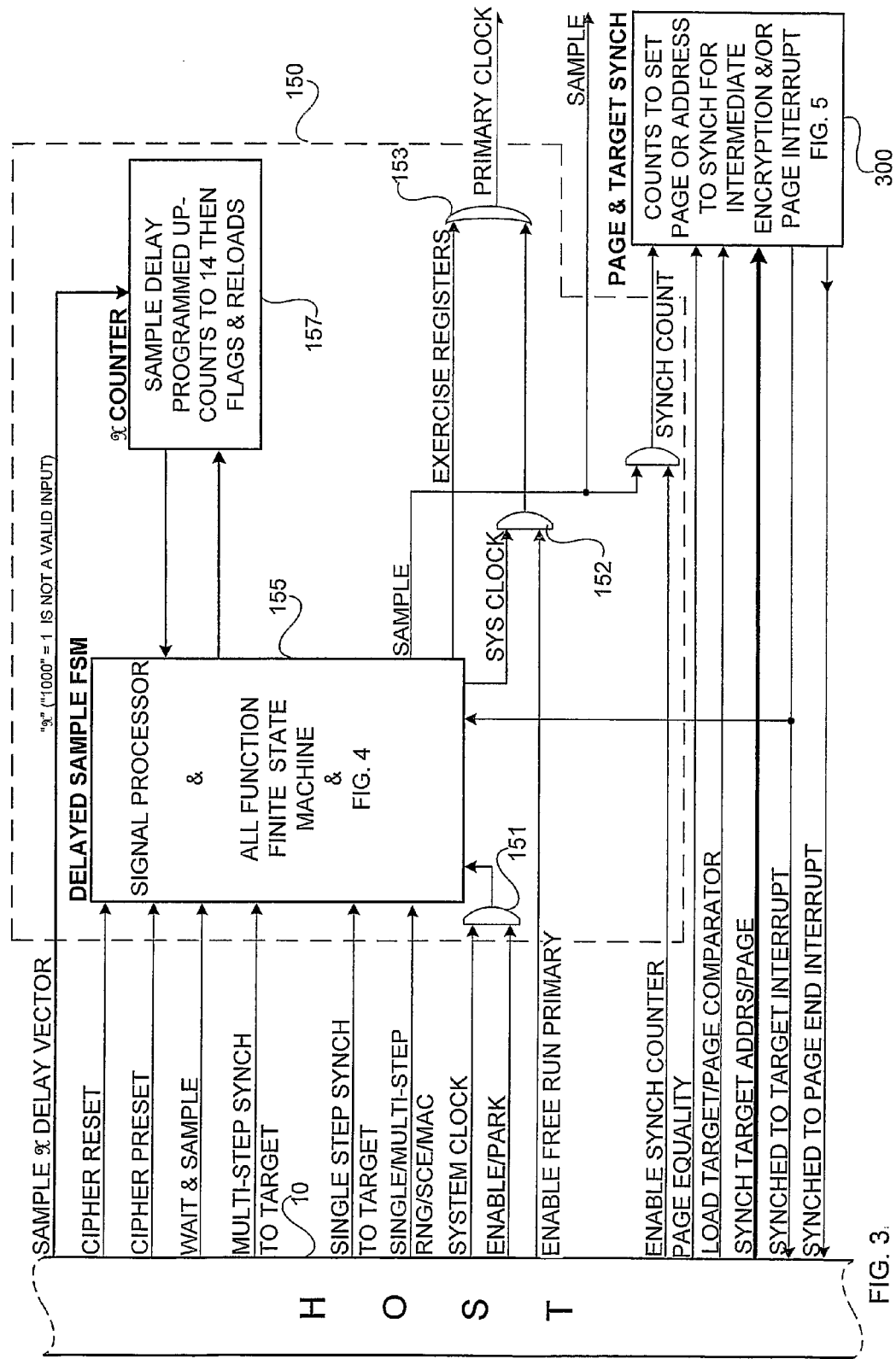
FIG. 3 is a simplified block diagram of the Finite State Machine operative to synchronize external controls, and supply necessary clock pulses.

| | |
|---|---|
| Enable Free Run RNG<br>FIGS. 2, 3 | lowered drastically. (See Rotate and XOR Tier Output Word, in Software "friendly" applications.)<br>Enabling the Free Run RNG couples the Primary Clock Directly to the System Clock, thereby activating (stepping) the chosen Tiers of the Register Bank for the duration of the Enable command. When the device is in a non-deterministic random number generation mode, particularly when initializing the ZK-Crypt to a random unpredictable initial condition, exercising the Register Bank and the controls for seemingly random intervals, uncontrolled by other Host commands is recommended. Preferably Single Tier activation for separate seemingly random intervals is recommended for initialization. |
| Enable/Park<br>FIGS. 2, 3 | The command that enables the System Clock, and hence the plurality of ZK-Crypt functions.<br>In most implementations, the Park Mode reduces current consumption during intervals when the ZK-Crypt is not operating. Park does not change variable values. |
| Enable ODDN<br>FIGS. 4, 6 | Enables the output of TOP, MID & BOT ODDN Permutations and the ODD4 Complementors each of which adds confusion, and complements Even Number Strings to/from Odd Number Strings. |
| Enable Single Tier Select<br>FIGS. (1), 6 | Typically, the Top/Middle/Bottom Controllers select a single Register Bank tier (to be shifted) in a seemingly random sequence.<br>When the Enable Single Tier Select is active ("1"), the Host is operative to override these single tier selects, and is operative to select any combination of one to three tiers to be shifted when a primary clock is activated. |
| Enable Synch Counter<br>FIGS. 2, 3 | The enabled Synch Counter is operative to receive a count increment pulse at each instant that a Sample pulse is generated. When the Synch Counter is disenabled, the Equality Comparator and the Synch Counters are in a sleep mode. |
| Feedback A/B<br>FIGS. 2, 14 | Feedback Multiplexer A is operative to input the masked value of a Message Word into the Feedback Store. The Message Authentication method is operative via Multiplexer A.<br>Feedback Multiplexer B is operative to input the Cipher Mask output into the Feedback Store. An optional mode with stream ciphering. |
| Feedback Mode (Select = 1)<br>FIGS. 2, 14 | When in Feedback Mode, the ZK-Crypt can increase diffusion and confusion of device/method variables and consequent output data by storing a previous partial word result in the Feedback Store, to subsequently complement bit values of activated tiers of the Register Bank.<br>The MAC digest operation consists of feeding back masked results of Message Words into the Register Bank, thereby diffusing the binary Message Words bits into the binary values of the Register Bank. |
| Load Commands<br>FIGS. 2, 3, 4, 5, 6, 10A, 11 | Commands and Registers for Loading the Register Bank, the Controls, and the Synch Comparator Register are Host dependent.<br>In the native 128 bit key, all secret I.C. variables are loaded directly. Additional secret inputs are implemented with proprietary protocols feeding message words via the Feedback Store into the Register Bank.<br>All variables, native and obscure are initially set to default values, generally zero, by the Cipher Reset Command.<br>The native 128 bit I.C. variables consist of the 3 tiers of the Register Bank, and the Cipher Control word, which are each loaded separately, after Cipher Reset. Extending the secret keyed initial condition space to include all obscure variables is typically enacted in the Single Step MAC Feedback configuration, wherein a plurality of secret words are preloaded (after Cipher Reset), with the Synch Counter Disabled. |
| Multi-step Synch to Target<br>FIGS. (2), 3 | The asynchronous command for preparing a decryption mask to start from a targeted word distanced from the first masked word by the target number (T) in the Synch Control Comparator. |
| | The ZK-Crypt executes the Wait and Sample Command<br>T + 1 times, and then generates an interrupt to the Host, leaving the proper mask for continued encryption.<br>During each step, a primary pulse activates the Register Bank. During the last step, a Sample pulse also latches the previous Hash Matrix —ODDN permuted output into the Intermediate Store, and optionally latches a value into the Feedback Store. |
| Page Equality<br>FIGS. 2, 3, 5 | A three bit number operative to regulate an output interrupt to the host, to signify an end of page of encryption masks. The Synch Comparator triggers the interrupt when the "Page Equality" designated number of Least Significant bits in the Target Register equals the same Least Significant bits of the Synch Counter.<br>The preferred embodiment page size is between 4 bits (16 masks → 16 × 32 = 512 bits of encrypted data in a page) to 10 bits (1024 masks → 32K bits of encrypted data in a page). The Synch Counter is typically connected to a Port in the Host, such that at each page end a transmitter can precede the next page of encrypted data with the total or a portion of the total Word count number in the Synch Counter.<br>The all zero (000) Page Equality input deactivates the Page Interrupt flag. |
| Sample Delay Vector<br>FIGS. 2, 3 | A 4 bit (constant —part of configuration) input specifying the number of primary clocks which activate the Register Bank prior to an automatically activated Sample Command, used only with the Wait and Sample command. The binary vector 1000 = 1 is not a valid input.<br>Single Step RNG/SCE/MAC activation of the ZK-Crypt is the preferred mode of operation and is not affected by the Sample Delay Vector. |
| Single/Dual Clock Mode<br>FIGS. 2, 4 | In the prior art, and in specific preferred embodiments of this patent, simultaneously interacting uncorrelated oscillators are used as a physical random source for random number generation. Obviously, an unpredictable clock source precludes deterministic number generation, as demanded by ciphering and message validation.<br>To establish unpredictability in number generators, wherein the output is read directly, the result must be read at random intervals, else, predictable patterns are recognized by standard testing programs.<br>The ETSI specifications for wireless devices preclude the use of a frequency source which is not a derivative of the system clock. Many of the chip manufacturers disregard this edict.<br>Typically, an ETSI acceptable device uses an autonomous clock to initialize a random number generator with a sufficiently large number of variables, operative to generate an initial condition which is intractably difficult to predict, during the power-up time interval, whence the device is neither transmitting nor receiving data.<br>A dual clock mode, wherein an autonomous oscillator useful for enabling unpredictability to a user who has extensive knowledge of the initial condition of the system, wherein such user has no relevant constraints on temporal current consumption, or is not in danger of generating noise in the specific electronic circuit. The autonomous oscillator typically is activated only when the primary clock is active, in Host defined commands, which typically include single, burst, or free run primary clock activation. The autonomous clock is only activated for random string generation, typically, for establishing initial random string conditions. The autonomous oscillator is activated by the Dual Clock Mode bit.<br>The Single Clock Mode is typically the default mode for RNG, SCE and MAC applications. When only the Single Clock Mode is allowed, the ZK-Crypt mechanism is typically first loaded with a secret seemingly random seed. |

Figure 4:
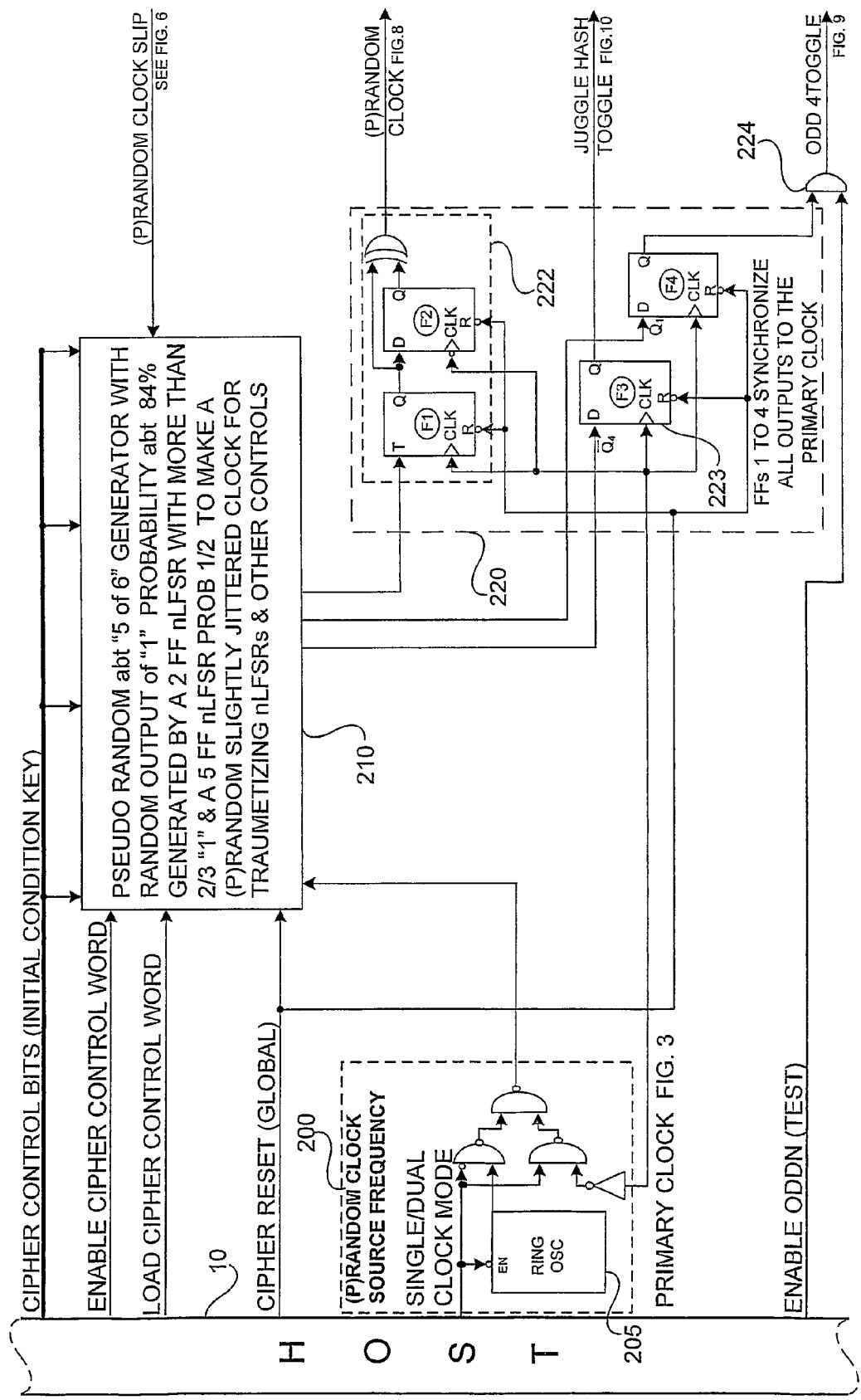
FIG. 4 is a simplified block diagram of an integrated clocking device operative to output either colored pseudo-random or random pulses, synchronized to the primary clock input.
Figures 10A, 10B:
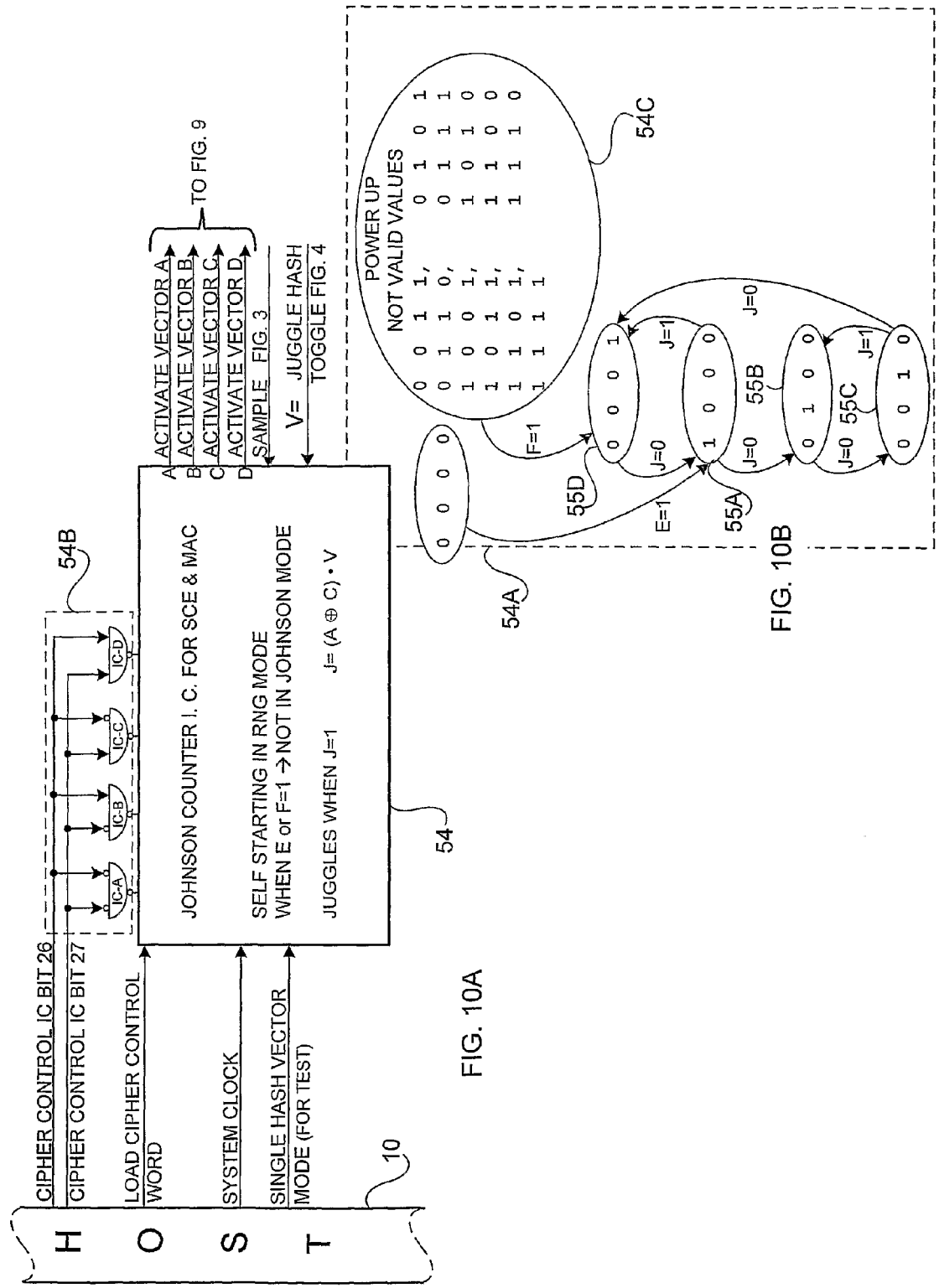
FIG. 10 is a state diagram depicting the operation of the joggled Johnson Counter Random Stepper operative to activate the Hash vectors of FIG. 9.

| | |
|---|---|
| | Typically, ring oscillators are used as sources for the uncorrelated clocks.<br>In software implementations, there is typically no direct equivalent to an autonomous oscillator.<br>Typically, the user will seed the ZK-Crypt software implementation with the RNG functions of the CPU, and then continue seeding with random input messages in the MAC Feedback configuration.<br>Real randomness in both software and hardware preferred embodiments is obtained, typically, by non-deterministic activations caused, typically by Host derived random intervals caused by users' depression of key switches on keypad.<br>All signals generated by the clock device of FIG. 4 are synchronized to the primary clock which is typically synchronized to the system clock. |
| Single Hash Vector Mode (Test) Select = 1 FIG. 10A | A test command that restricts the Hash Matrix Rule to a single Permutation, primarily for testing. When in Test Mode Presetting the IC control bits 26 and 27 to "1" (11), directly connects the Hash Matrix Inputs to the Hash Matrix Output. |
| Single Step RNG\SCE\MAC FIGS. 2, 3 | The most efficient and preferred mode of operation for Random Number Generation (from an Initial Condition (Random)); stream cipher encryption and decryption; and message authentication.<br>A single concurrent primary clock pulse and Sample pulse, activates the selected tier and latches the previous output of the ODDN permuted Hash Matrix into the Intermediate Store and optionally also into the Feedback Store.<br>At the end of the cycle, the RNG or SCE result; a random number string; or an en/decrypted message word appears on the result bus, valid until the next Primary Clock pulse which activates the Register Bank.<br>When in MAC mode of operation, the first stepped digest results are not read by the Host, but are "recycled" into the Register Bank at the next step; the last "signature" steps, without Feedback recycling are read by the Host. |
| Synch Num Out FIGS. 2, 5 | The Synch Counter value is preferably ported to a Host Portal, and is readable at any instant.<br>Typically, for wireless and Internet applications, a portion of the Synch Counter value will be transmitted by the Host at every Page Interrupt.<br>In long Internet transmissions, wherein pages occasionally arrive at a destination at an unexpected order, the Synch Num Out typically will direct encrypted pages to properly designated addresses in storage memory. |
| Synch Target Address FIGS. 2, 5 | A Word input into the 32 bit Synch & Page Target Register. The Target value typically is the distance to the first word to be decrypted in a long file. |
| Synch to Target FIGS. 2, 3 | When decrypting a file, starting at any word which is not the starting point, the decryption mask must be activated the "offset" distance from the beginning of the encrypted cipher text.<br>The circuit of FIG. 3 is activated either by the Single Step Synch to Target, in the Single Step Mode, where at each cycle, a new unused mask is generated, or by the Multi-Step Synch to Target, wherein a new unused mask is generated at each Sample signal, using the Wait and Sample module.<br>The procedure generates all unused masks, up to the Synch Target Address, whence an interrupt flag is raised. |
| Synch to Page Interrupt FIGS. 2, 5 | The Equality Logic Array regulates the number of and value of the LS bits of the Synch and Page Target Register operative to trigger an interrupt. The Page Equality denotes one of the seven page lengths. See Page Equality. |
| Synch to Target Interrupt FIG. 5 | An interrupt flag activated by the Equality Comparator when the Synch Counter value is equal to the value in the Synch and Page Target Register. The Synch Interrupt initial value at Cipher Reset is FF...FF. Cipher preset resets the counter to 00...00. |
| System Clock FIGS. 2, 3 | The System Clock is typically a derivative of the Host clock. With the exception of the (P)Random Clock generator operating in the Dual Clock Mode, the System Clock is the sole synchronizer/clock driver of ZK-Crypt. The Primary Clock is derived from the System Clock and is active only when commanded by the Host. The System Clock is used to shape pulses. |
| Top, Mid, Bot Tier Always FIGS. (2), 6 | The three Tier Selectors which are operative to enable any or all tiers when the Enable Tier Select is at "0". Typically, tiers will be activated singly for testing purposes.<br>For those operations demanding the complexity of three tiers, constant operation, all three Tier Always control bits will be "0". |
| Wait and Sample FIGS. 2, 3 | The asynchronous command operative to activate the Register Bank, a fixed number of steps wherein at the last step a Sample command outputs a new result. |

Figure 1:
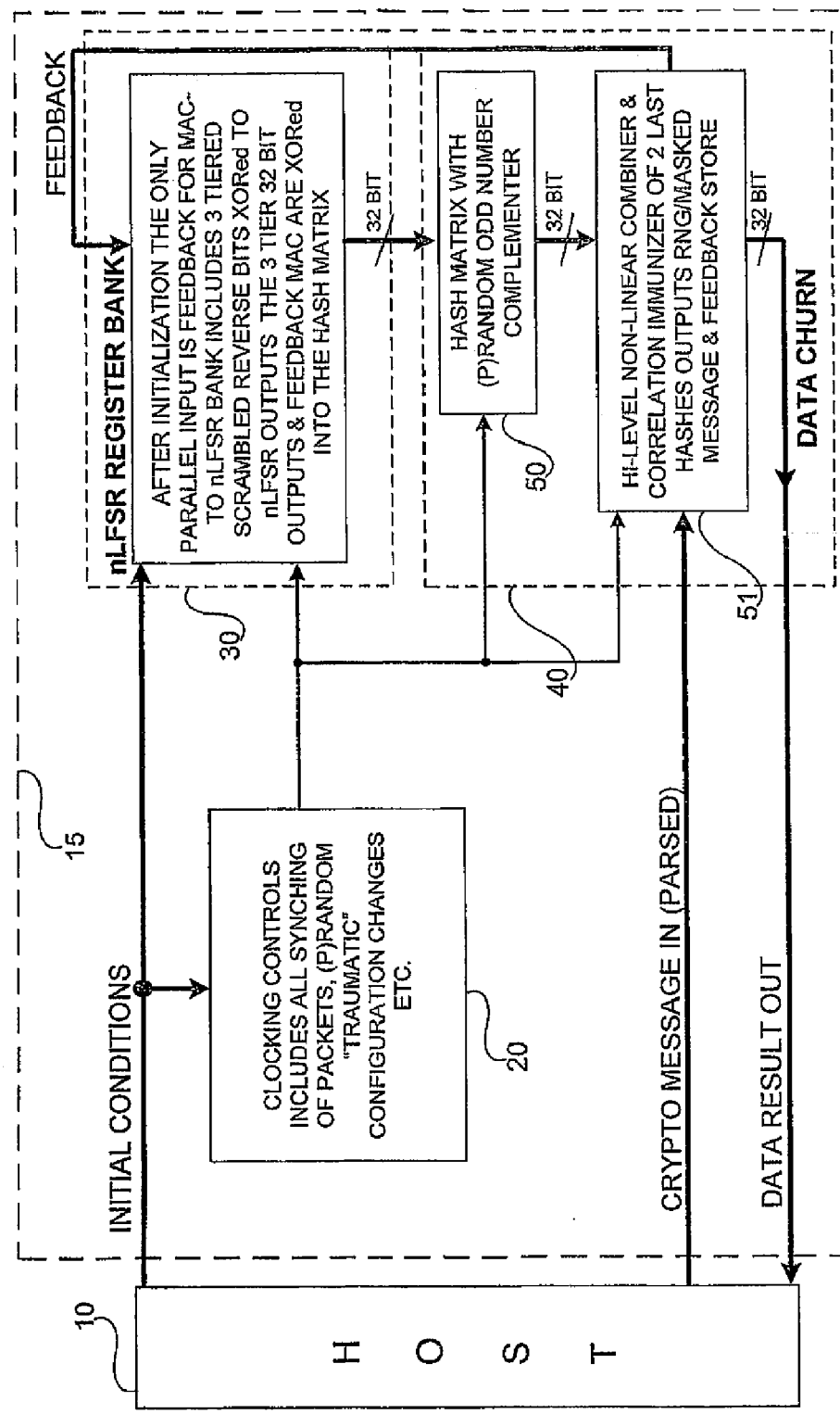
FIG. 1 is a simplified functional block diagram overview, depicting the interaction of main functionalities of the invention.

FIG. 1 is a self explaining simplified functional block diagram overview, depicting the ZK-Crypt device 15, which interacts with a Host to implement the principal functionalities of the invention; Random Number Generation, RNG, Stream Cipher Encryption, SCE, and Message Authentication Coding, MAC. Typically for RNG, the host sends commands to the ZK-Crypt 15 to generate a random initial condition, such that subsequent unpredictable Data Results Out words are read by the Host preferably one word at every System Clock delivered to ZK-Crypt 15.

Using the Seeded RNG as a Stream Cipher Mask

For the deterministic SCE the Initial Condition is the Secret Encryption/Decryption Key known to the encryptor and the decryptor, wherein the changing variables are the Running Encryption Key. The "Native" key, first loaded key, of the preferred embodiment, consists four 32 bit words, a control word is loaded into the control/clock module 20 and register bank 30 initial condition words are downloaded into the nLFSR Register Bank.

Using the Seeded RNG as a Message Authentication Coder

For unkeyed MAC, the Host configures the Initial Conditions to a publicly known non-secret value. For secret keyed MAC 20 and 30 are configured with secret Initial Conditions as in SCE. After native initializing, the secret key can be extended by another "Obscured" 70 bits, by pseudo-encrypting at least three Message words, thereby initializing new seemingly random values, into the Intermediate and Feedback Stores, and another six bits into non-directly programmable flip-flops, and simultaneously increasing complexity of the previously programmed native Initial Condition.

The register bank's tier outputs are XORed together into a 32 bit word to be filtered in the Data Churn 40. The output of register bank 30 is permuted by a Hash Matrix 50 followed by four randomly activated odd number bit Complementors, to preliminarily disguise correlation between stages of the tiers. In the output section 51 the two last outputs from the hash matrix 50 are combined in a non-linear correlation immunizing filter with memory. The output of the combiner serves as the RNG output, and also as the Mask for the SCE, and the mask for the MAC message word. The two last 32 bit XORed results of the Mask and the MAC message word are combined and held in the Feedback Store, to be fed back and digested into the nLFSR Register Bank.

DT2 The Basic Parts of the ZK-Crypt

FIG. 2 is an explicit guide to the interactive functional blocks showing the essential input/outputs to the ZK-Crypt 15 from a computerized Host 10. A brief description of the input and output signals, data and commands is found in the previous table.

Clock Controls

The Clock Controls 150 are a combination of a finite state machine, FSM, an autonomous oscillator and a machine synchronizer. The FSM is operative to exercise the nLFSRs free run, typically for random intervals to establish initial conditions for the RNG, to operate the controls with the (P)Random Clock, either pseudo-randomly for the deterministic SCE, MAC and for a randomly initially conditioned RNG mode. The FSM is operative to initialize an SCE encryption mask for "middle of the file" decryptions, to perform single step or multi-step encryption/decryption, when the Register Bank is activated simultaneously when 150 issues a Sample command, or when the Register Bank is exercised a number of steps before the Sample command. Module 150 also performs the last step of initializing the Register Bank, the delay clocks and the combiner 190. The Clock Controller also toggles the ODD4 Toggle Complimentor.

Synch Control

The Synch Control 300 is operative to count the number of executed Sample commands for mid file decryption, for interrupting the Host at the end of a "page", for interrupting the Host when a targeted number is reached. The Hash Control randomly steps the Hash Matrix 50 at each Sample command operative to change a matrix permutation. The Tier Controls module 110 consists of three autonomous Control units which activate the 3 tiers 120, 130, and 140 randomly one at a time, or together, sending Slip pulses at random instants either to the left or right hand nLFSRs in the tiers, regulating the Brownian auto-XOR permutations and randomly switching three of the four odd number Complementors in 50.

Data Churn

The Data Churn 40 is operative to process the output of the Register Bank 30 when the Clock Controls 150 sends a Sample pulse. The Hash Matrix and ODDN Complementors 50 together form a seemingly random combination of 64 displacement and complementary permutations. The Combiner 190 pseudo half adds the two last Sampled outputs of the Hash matrix. Rueppel has shown that the Combiner 190 operation successfully eliminates any correlation between the output and any of the subelements in the non-linear Feedback Shift Register Bank 30.

In the RNG mode, the output of 170 is typically the Data Result Out. However, an atypical User has the option to further mask the random number output with a message word in message combiner 190. Typically message combiner 190 XOR combines a Message Word, for either the SCE mode or the MAC digest mode with the Mask output of 170.

The Feedback Mux Store & Correlation Immunizer 400 is similar to the pseudo half adder in 170 principally operative to add diffusion to the Message digesting function of the MAC.

DT3 Clocking Functions

FIG. 3 is a simplified block diagram of the Crypto Function Timing Control Circuitry operative to synchronize external controls, and supply necessary clock pulses. The Timing Control Circuit is designed to regulate all of the initialization and operative phases of the SCE (Stream Cipher Encryption) \MAC (Message Authentication Code)\RNG (Random Number Generation) modules with mode options for variable complexity, speed and power consumption.

Other Clock Modes

The ZK-Crypt consumes minimum energy when the gate 151 is set in Park mode, thereby disabling the System Clock, and when the Source Clock, FIG. 4, is in Single Clock Mode, and the Ring Oscillator 205 is quiescent. Setting gate 152 in Free Run Primary mode, typically exercises the ZK-Crypt in a higher current consumption mode, operative to randomize tiers for RNG functions.

Initialization

Initialization of the ZK-Crypt via the Function Timing Control Circuit for SCE and MAC functionality (and also for testing functionality of the ZK-Crypt) must always commence with the (global) Cipher Reset. (Resetting the ZK-Crypt prior to generating random numbers typically reduces entropy, and is not advised.) Following the Cipher Reset Command, the Initial Conditions of must be loaded, including the three tiers 120, 130 and 140 and the Control Word which consists of values in the 26 bits into Tier Controls 110, 2 bits into the Hash Controller 54 and 4 bits into the Clock Controls 150. In another preferred method of initializing the ZK-Crypt, after Cipher Reset and loading Control Constants, a series of secret initial condition Message words are pseudo-digested in MAC feedback mode, thereby diffusing secret values into the binary variables of the ZK-Crypt.

For Multi-Step RNG, SCE, or MAC operation the constant non-secret Sample X Delay Vector input into the 4 bit X Counter 157 is set, as are all other configuration settings, prior to issuing the Cipher Preset command. The Delay Vector number, (MS bit right hand) is the total number of Primary Clocks (including the Sample Clock) that the Register Bank will be exercised for a single Sampled output. "$0100_2$" to "$1111_2$" (2 to 15) are valid inputs. Single Step operation, wherein the Sample pulse and a single Primary pulse are emitted simultaneously is actuated by the Single Step RNG/SCE/MAC command, which is oblivious to the Delay Vector setting.

Presetting of the control constants prepares the circuit for Single or Multi-Step nLFSR Register activation, for single system clock (deterministic) or dual clock (random) operation; for single tier (low power) or triple tier (higher complexity) nLFSR activation (at each Primary Clock) and for message feedback (increased complexity RNG, SEC or normal MAC functions). The Cipher Preset, then exercises a single step, wherein the Sample Delay Counter 157 is loaded, and the Intermediate Correlation Store 170 is loaded whilst the Tiers are activated for a single shift. The Feedback Mux Store 400 remains unchanged, unless a Message Word not equal to zero is resident in message combiner 190.

For SCE and MAC the deterministic Key is normally a seed of 128 bits, 32 bits in each tier and 32 bits of control word.

Extending the secret keyed initial condition space to include all obscure variables is typically enacted in the Single Step MAC Feedback configuration, wherein a plurality of secret words are loaded into message combiner 190, and subsequently typically three or more Single Step commands are issued, (after Cipher Reset), with the Synch Counter Disabled, diffusing the Message bits into the new Initial Condition. Such an extension adds another 70 binary variables for a total of 198 bit new Initial Condition.

Single Step Operation

Single Step ZK-Crypt operation is the preferred mode for commercial and civilian applications. In Single Step RNG or SCE operation the ZK-Crypt Samples and outputs 32 bits of cipher text; or Samples and outputs an unpredictable string of 32 bits at every step of operation. When in MAC mode, in a first phase, the ZK-Crypt digests 32 bits of message text at each clock, then in a second phase outputs, at each clock, 32 bits of message identifier code. The function, during a Single Step cycle activates the Random Clock Generator, the Top, Mid and Bot configuration controllers, and, via the Intermediate Store, "draws" the random signals through a myriad of randomized glue logic filters: and XORs the 32 bit value with the previous 32 bit value stored in the in the Intermediate Store.

Page and Target Synch Counter/Comparator 300 (elaborated in FIG. 5), counts to the page set by the 3 bit Page Equality constant, operative to interrupt the Host. The Target count is set to halt the Multi-Step Synch to Target or the Single Step Synch to Target for mid File start of Decryption mask preparation.

The Initial setting of the ZK-Crypt for SCE or MAC modes is, in each case, is a "known" value. For SCE, this must be a secret value, known to the encryptor and decryptor. If the MAC initial setting is a secret, this is an equivalent to a keyed hash value, wherein only the "owner" of the confidential value can ascertain the authenticity of the hash.

Typically, the MAC will be performed, in a specific environment with the same initial condition (note above, typically after reset and preset to a constant initial condition). The strategy for exchanging and determining SCE keys for each data set is typically unalterable, once a particular strategy based on client demands is established. An SCE key set, typically, is never used more than once.

Wait and Sample is the asynchronous operation to increase complexity of results in all three modes, using the Delay Vector value to define the "Wait".

Preventing MAC Collisions

In the MAC configuration accelerated diffusion of single bits is of primary importance to prevent "collision". Collision describes the event that a change in the ZK-Crypt variables caused by one alteration in a MAC Message, e.g., "Deposit $150" to "Deposit $150000", can be compensated for in another place in the same message, e.g., change "Best Regards" to "All the Best", wherein the final MAC signature will be identical. In the single step, multi-tier configuration at least four bits out of the 32 bits are toggled by a single bit change in the message. Each additional rotational step (clock cycle) of the register bank increases the diffusion, until after four rotations, the average of "hits" and "misses" will be equal.

The Single Step Synch to Target input activates a synchronous procedure that increments the ZK-Crypt engine from the initial setup condition to the "targeted" index number of the mid file encryption word. In stream cipher encryption, typically, the cipher masks (the obscure conditions of the variables in the encryption engine) are not affected by the Message that is being encrypted. Therefore, in single step mode decryption, each Primary Clock activation increments the engine for a "distance" of one word from the start of the file; and in this mode, the engine is incremented to the distanced word indexed in the "Synch Target & Page Comparator". For applications driven by a finite state machine, where the outputs are DMA (direct memory accessed) placed in a file, this command could be used for filling a "One Time Pad" memory device with a long secret key file.

Synch counting is typically essential for synchronizing long transmissions over multi-channeled networks, e.g., the Internet. When enabled the counter in 300 is incremented at each Sample command.

Modes of Primary Clock Operation

There are five modes of Primary Clock operation:

i) Single pulses are emitted when the ZK-Crypt is activated by the "Single Step Encrypt/RNG/Authenticate" Command. This single step pulsed Primary Clock cycle activates a Sampling flag that loads the Intermediate Store (and optionally the Feedback Store), clocks the "5 of 6 Random Clock" (in Single Clock Mode) and synchronizes the (P)Random output, and simultaneously clocks the Register Bank. The command to single step is typically issued at arbitrary intervals, by the Host. At each clock, the output is typically read by the Host.

ii) A burst of X pulses (defined by the Sample Delay Vector input), wherein at each Multi-Step Command flag (X−1) pulses activate the 5 of 6 Random clock and the Register Bank, and on the last X'th pulse, the Primary Clock additionally activates the Sample Command to load the Intermediate Store (and optionally, the Feedback Store) and optionally pulse the Synch Count.

iii) A long sequence of pulses, wherein the "Single Step Synch to Target" activates the Primary Clock; simultaneously activates a Sample to the Intermediate (and optionally to the Feedback) Store(s); and also emits a pulse to the Synch Count; this sequence repeated until the decryption mask is set for decoding the cipher text starting from the specified word in mid file.

iv) A long sequence of pulses, wherein the "Multi-Step Synch to Target" activates the Primary Clock to "churn" the random controllers and the Register Bank a defined number of pulses; and at the last pulse of each multi-step cycle activates a Sample to the Intermediate (and optionally to the Feedback) Store(s); and also a pulse to the Synch Count, repeatedly until the decryption mask is set for decoding cipher text from the defined word in mid file.

v) A free run activated Primary Clock to "churn" the random controllers and the Register Bank an undefined number of pulses for increasing complexity in random number generation. The generator is typically either operating in Dual Clock Mode, wherein the random controllers will be activated by the autonomous oscillator, with the output synchronized to the Primary Clock, or in Single Clock Mode, typically after random initialization of the ZK-Crypt. The Sample to Intermediate and Feedback Stores are activated to output a random string. The Synch Counter would typically be redundant in the RNG mode.

The Synch Counter with its auxiliary Comparator is enabled to count by gate 154. Typically 300 counts the encrypted and digested Message Authenticated words, and outputs flags (interrupts) to denote new pages and/or an end of defined operations, as for mid file decryption or proving to a remote communicant that data packets have arrived in the proper sequence.

DT4 (P)Random Clock

FIG. 4 is a simplified block diagram of an integrated clocking device operative to output either colored pseudo-random or random pulses, synchronized to the primary clock input.

Two alternate clocking sources drive the (P)Random Clock Generator 210. The most important is the Primary Clock, see FIG. 3, which is operative to drive and synchronize the Generator 210 in all modes of operation. For RNG functions wherein a Ring Oscillator 205, in the clock source 201 of the generator 210 neither interferes with the normal operation of the Host 10; e.g., the free running frequency does not interfere with wireless transmission and reception, nor does the increased current consumption inordinately drain the battery; the Dual Clock Mode is preferable for increased entropy.

Figure 6:
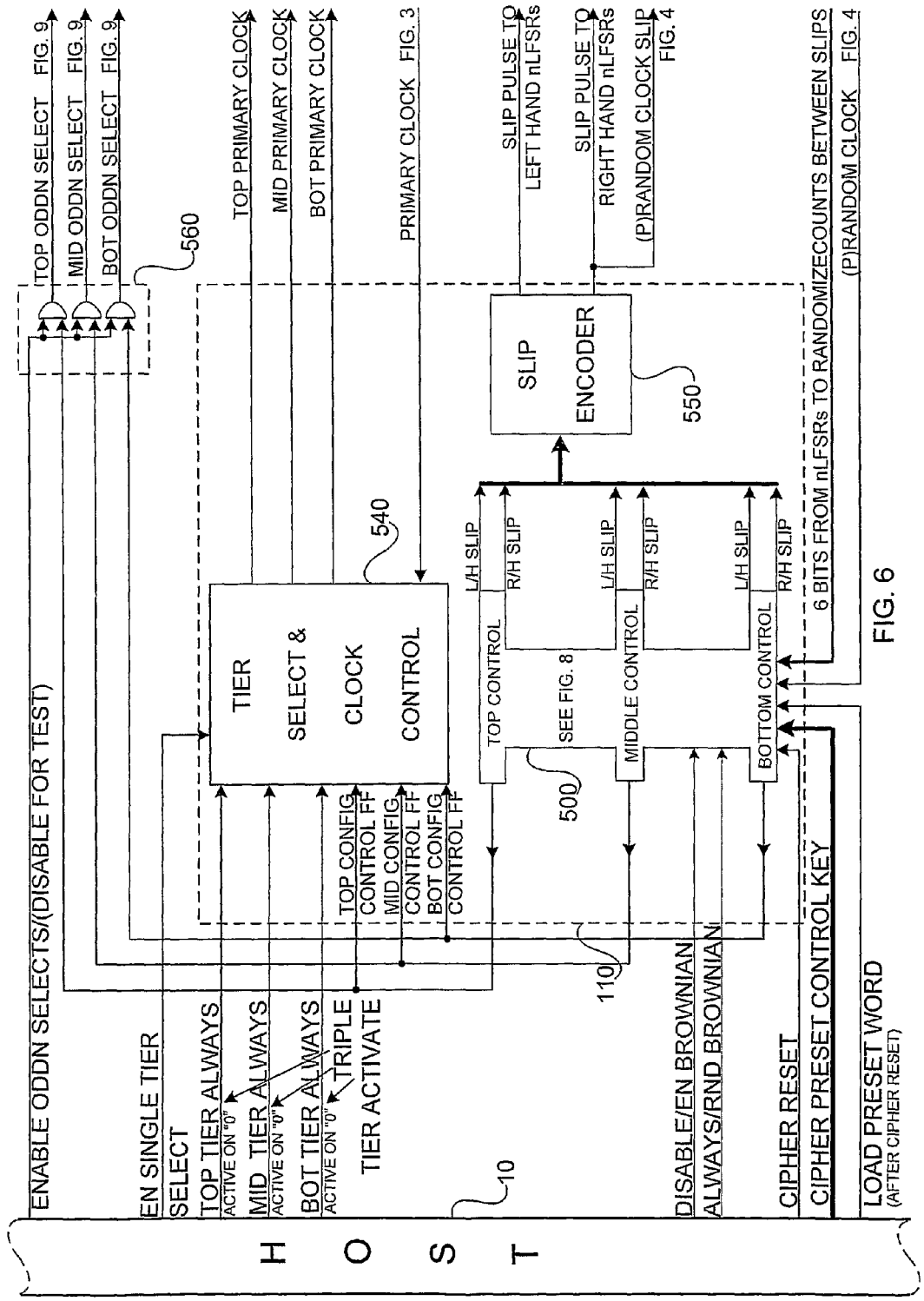
FIG. 6 is a simplified block diagram depicting the integration of the top, middle and bottom control units, operative to select ODDN complementors, to activate tiers singly, or in groups, and to emit slip displacement pulses.

The Clock Generator 210, is operative to drive the randomizing Control Units in FIGS. 6 and 8, at about 84% of the speed of the Primary Clock. Stated differently, occasionally the (P)Random Clock output does not "mirror" the Primary Clock, as one or two pulses are "randomly" missing from the Host commanded Primary Clocks. This means that the random triggered outputs of the Control Unit are seemingly even less correlated.

The (P)Random Clock Slip pulse from FIG. 6 aberrates the stages of a 5 celled nLFSR in 210, without changing the serial output statistics. A 5 celled nLFSR with the NOR gate insertion of the all zero stage, see FIG. 11A, with or without a Slip aberration has an average random output of one half ones. Such a five celled nLFSR's NOR gate serially outputs a one at $2/32$ of the instants. A two celled native LFSR's stage sequence without the NOR gate extension does not include the "00" stage (unless the initial condition is "00"); i.e., the native serial average output is $2/3$ ones and $1/3$ zeroes. The seemingly random NOR generated ones are ORed to the feedback of a two celled nLFSR to raise the average ones output of the 2 bit nLFSR to $2/3 + 1/3 \cdot 2/32$.

The ZK-Crypt operates in Single Clock mode for all deterministic operations, wherein the generator 210 is synchronized to the Primary Clock. When the generator 210 is operating in the RNG Dual Clock Mode, it is typically, not synchronized to the Primary Clock pulses. The synchronizing block 220 shapes output pulses to assure that clocking device 200 outputs will be synchronized to the Primary Clocked ZK-Crypt functions. Flip-flop pair F1 and F2 with NXOR output the (P)Random Clock which drives FIGS. 6 and 8. Toggle flip-flop F1 changes polarity when the T input is one as the Primary Clock signal rises from zero to one, in the first half of the clocked period. Data type flip-flop F2, assumes the output binary value of F1, as the Primary Clock signal falls from one to zero in the second half of the clocked period. NXOR gate therefore outputs a zero in the first phase of a Primary Clock pulse when the T input is a one and the NXOR gate of 222 outputs one at all other instances. Flip-flop 223 outputs the complemented output value of the 5 celled nLFSR of 210. This generates the full period Juggle Hash Toggle of FIG. 10, operative to be one, typically one half of the time. AND gate 224, generates a full clock period one at any rising Primary Clock pulse coinciding with a one output from the second LS cell of the 5 celled nLFSR of 210, $Q_1$.

DT5 Block DIAG Synch Top & Page Interrupt

Figure 5:
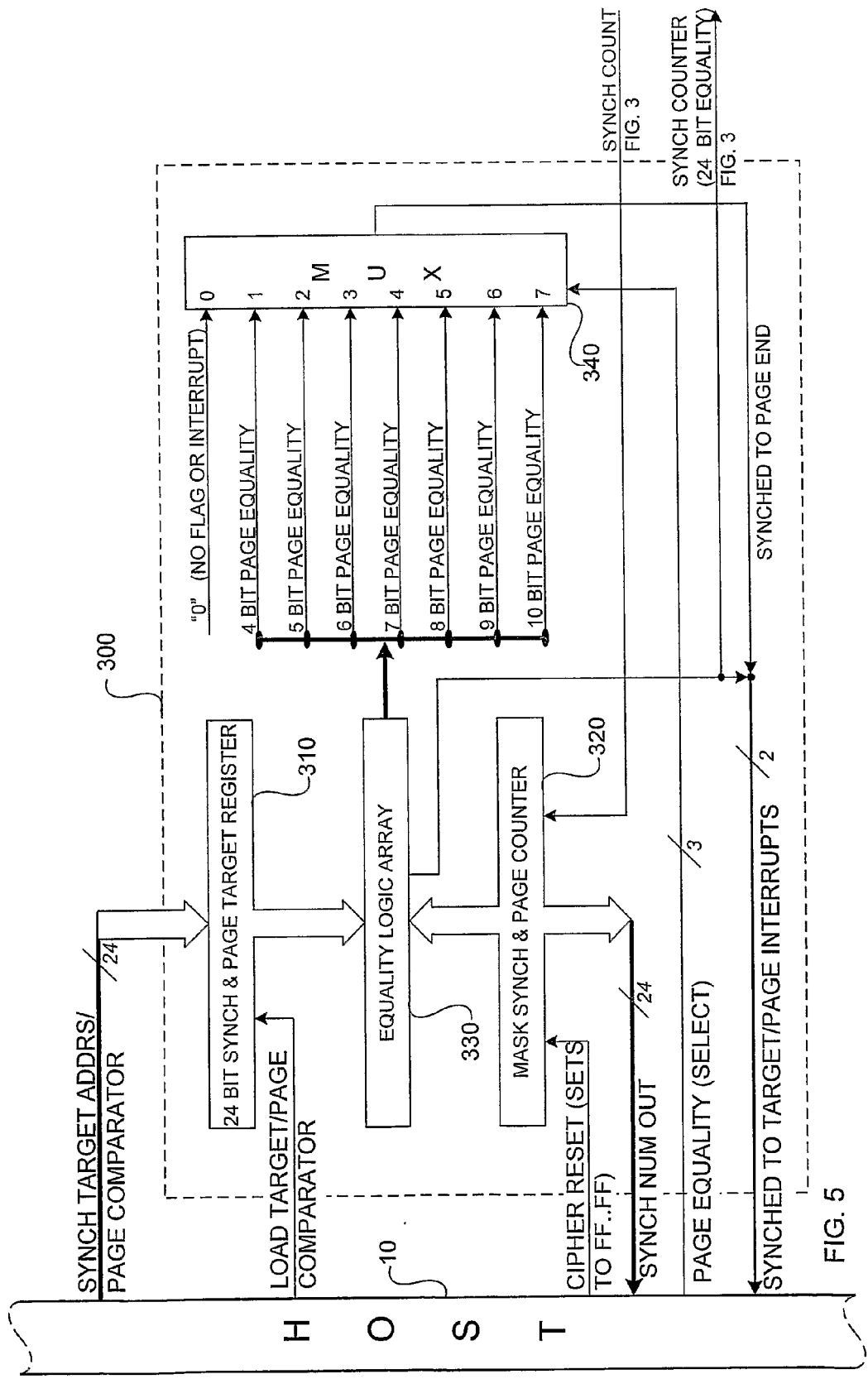
FIG. 5 is a simplified block diagram depicting the method of parsing packets of "message" into pages, or into a targeted address, wherein a dual comparator transmits page and target address interrupts.

FIG. 5 is a simplified block diagram depicting the device of parsing packets of "cipher text message" into pages, and/or interrupting a sequence at a targeted address, wherein a dual purpose comparator transmits page and target address interrupts.

Stream ciphers are probably the most used symmetric encryption mechanism, especially suitable for transmission over noisy channels, as when encryptor and decryptor are bit wise synchronized, faulty bits do not propagate error. To the best of the inventors' knowledge, no cost effective method has been devised which successfully bit-wise synchronizes on the fly. Frame or packet synchronization as practiced in conventional communication and is implemented in 300, can be less efficiently embedded in firmware. In a preferred embodiment, when a start of page frame is sent/received, both sending and the receiving devices will generate an interrupt, whence the sender will insert the value in the Mask Synch & Page Counter 320 read on the Synch Num Out word. Typically an Internet receiver will evaluate the count number to see if the Frame arrived in the proper sequence, by XORing the received count value, with the value in the receiver's Counter.

In preferred embodiments in mass storage devices containing stream enciphered long files, a running key for mid word sections of the file must be prepared. (An unsavory alternative would be to establish and save and use a unique secret running key for each mid section.) As the ZK-Crypt can generate a 32 bit mask at each system clock cycle, this problem is essentially averted with the built in Single Step Synch to Target and Multi-Step Synch to Target commands, see FIG. 3, which automatically step the ZK-Crypt from the formal first word of the encrypted file, using the secret key known to the encryptor and decryptor, generating (but typically not using) mask after mask up to the targeted mid file word mask, at which step it generates a Synched to Target Interrupt. Typically the Mask Synch and Page Counter 320 data output is ported to the host, and can be read and transmitted at will. The Equality Logic Array 330 generates the Synched to Target Interrupt, when the value in the Counter 320 is equal to the value in the 32 bit Synch and Page Register 310.

A serious problem, unique to stream ciphers, is the necessity of generating, distributing and/or saving an unpredictable secret key for each new data set. This is necessary, as an adversary who has access to a cipher text and the clear text source, can XOR the each successive cipher/plain text word pair and learn the encrypting sequence which was generated by the given secret key. (Note, it would be intractable to extract the key.) Methods for deriving secret keys from key pairs known to sender and receiver, using a 32 bit word sent in the clear are easily devised; e.g., increment an index; XOR the new index number to the original secret key, and exercise the ZK-Crypt S sample cycles using the Wait and Sample function, with Delay Counter set to D cycles of exercising the tiers, (1<D<16) in a Feedback mode to establish a new running key; knowing that the increment is well diffused into the new initial condition running key.

In preferred embodiments, a target word is loaded into the target store 310 the 32 Bit Synch and Page Target Register, wherein the LS bit sits in the left-most cell. From 4 up to 10 LS bits of the of the target word define the LS bits of a start of a page, e.g., 8 bits define 256 word pages; a Page Equality 3 bit input word set to $110_2 = 6_{10}$ addressing multiplexer 340, defines an interrupt every 512 encrypted words.

Synch Count, when enabled, see FIG. 3, increments the Mask Synch and Page Counter 320 at each instant that a new Mask is Sampled, see FIGS. 1,2,7, and 14.

Logic in Equality logic Array 330 outputs 7 flags to multiplexer 340 signaling page lengths of 16 to 1024 thirty-two bit words. The Multiplexer 340 is operative to select which, if any of the flags generates an Interrupt. Interrupt flags are typically generated at the beginning of each page, preferably, both in the encryptor and decryptor.

In many instances the encryptor and decryptor are the same entity, wherein the encryption device is embedded in a secured environment, operative to encrypt and store large files of data in an insecure storage device. At the header of each large encrypted file of data, the device typically stores an encoded equivalent of the secret initial condition key.

DT6 Activating Tier Clock & Selecting Tier Slip & ODDN XORing

FIG. 6 is a simplified block diagram depicting the integration of the top, middle and bottom control units, see FIG. 8, operative to activate tiers randomly, singly, or in groups; to select ODDN complementors, and to emit slip displacement pulses to left or right hand nLFSRs of the 3 tiers, and also to aberrate the stage sequence of the 5 cell nLFSR in the (P)Random Clock Generator of FIG. 4.

The central Control of Aberrations 500 of the Register Bank 30 and the Data Churn 50, in FIG. 2, consists of three control units, described in FIG. 8. Each of which randomly, on an average of about one in 11.3 Primary clocks (one in 9.5 (P)Random clocks), is operative to generate either a Left or Right Slip pulse, and once in 19 (P)Random clocks, to simultaneously complement the Control Flip-flop output, see 530 in FIG. 8.

The Slip Encoder 550 pseudo-randomly combines the pulse signals, such that Slip pulses are transmitted simultaneously to all three tiers. The Right Hand Slip pulse causes a slip in the 5 cell nLFSR of 210 FIG. 4.

When regulated in the Random Brownian mode, the TOP, MID and BOT BROWN signals are operative to seemingly randomly toggle the pseudo-Brownian permutations in the Top, Middle and Bottom tiers. (See Rotate and XOR Tier Output Word for a software "friendly" alternative to the pseudo-Brownian displacement function.)

The three Control Flip-flop outputs address a multiplexer in the Tier Select and Clock Controller 540. The Controller 540 is operative when activated by the En Single Tier Select. When a tier (120, 130 or 140) is selected, each Primary Clock pulse activates a stage change in the selected nLFSR. When the En Single Tier Select is not activated, the Host 10 optionally selects which single tier, typically for test, or which combination of tiers, are activated by the Primary Clock.

The three unbiased Top, Mid and Bot ODDN Select complement vector drivers emanating from enabler 560 are the unbiased Control Config signals from the control units 500. Together they randomly complement 31 of the 32 Hash Matrix outputs. (The number 4 bit out put of the Hash Matrix is randomly toggled by AND gate 224 of FIG. 4). The triplet of ODDN selectors 560 is typically disabled by the Enable ODDN Selects for hardware testing.

DT7 Omnibus Combiner with MAC

FIG. 7 is a simplified diagram of the data processing modules driven by control devices of FIGS. 3, 4, 5, and 6, showing the devices with memory which are shifted, and aberrated randomly, or are combined, sampled and stored.

The three tiers, 120, 130 and 140 each consisting of two unique nLFSRs and a pseudo-Brownian filter are each a slightly biased pseudo-random binary sequence generator, operative to change state in random turn or in tandem to produce a combined word, in Tier Combiner 49 to be input into the Hash Permutation Matrix 50. The 13 bit nLFSR residing on the Left Hand side of the Top Tier of the Register Bank is described in FIG. 11. The general configuration of all six nLFSRs is similar; they are differentiated by the number of cells, and the feedback taps. Likewise, the general configuration of the three tiers is similar; being differentiated by the pairs of nLFSRs, and the pseudo Brownian permutation vectors. The Top Tier 120 is described in FIG. 12. The Three Tier Combiner 49 consists of the equivalent of 32, 3 input XOR gates, operative to combine each of the bits, from the LS to the MS of the three tiers. in the 3 tiers combiner 49 is a passive logic array, combining the present outputs of the three tiers. The outputs of the tiers are active (not 3-State) even when a particular is or is not clocked.

Hash Matrix

Figure 9:
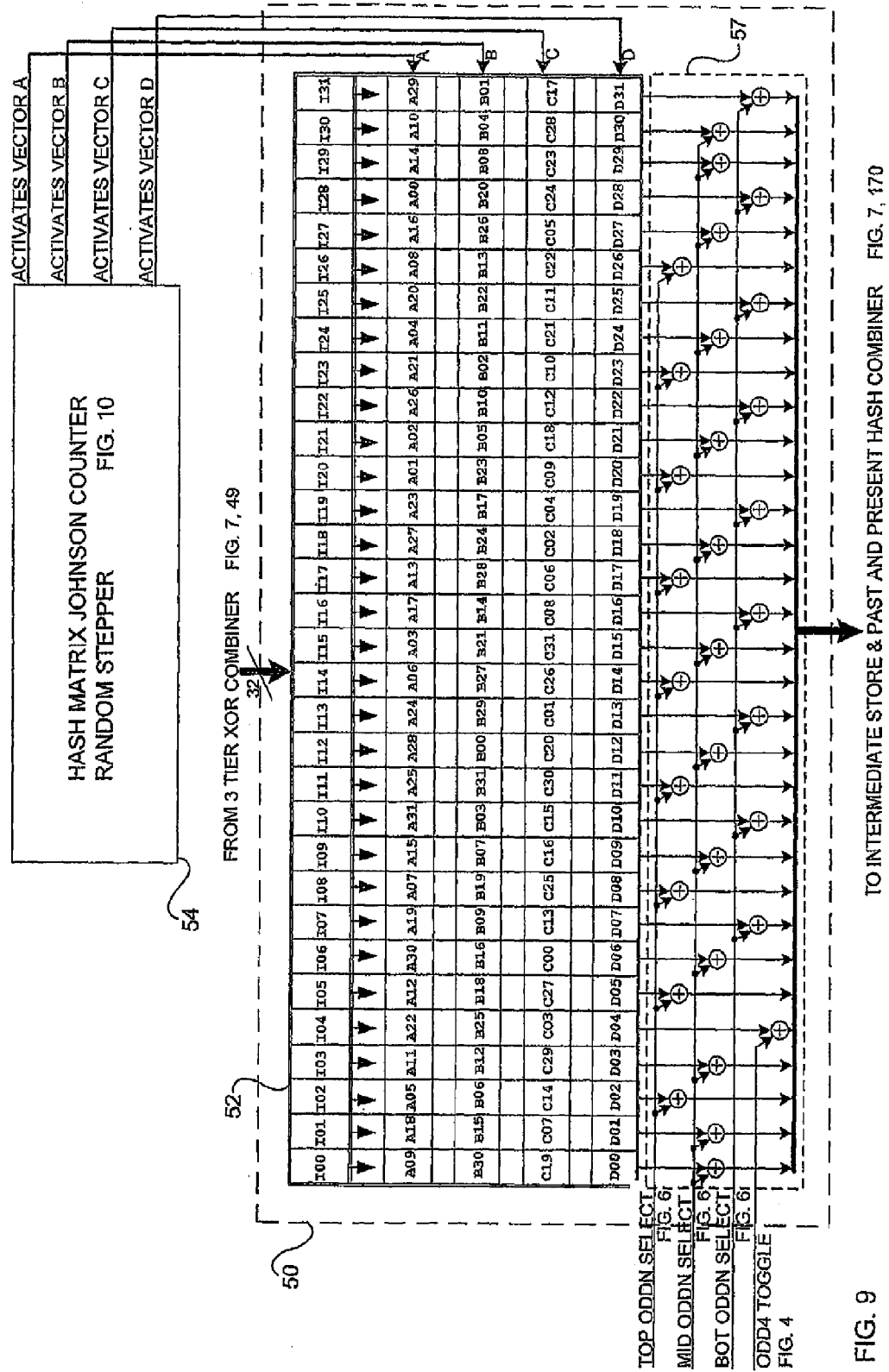
FIG. 9 is a matrix table demonstrating the permutations on the 3 tier XORed word directed by the Johnson Counter Random Stepper of FIG. 10, and the ODDN switches.

The Hash Permutation Matrix with ODDN Permutations 50 is described in FIG. 9. There are four Hash displacement vectors, one of which is a direct one to one output (no displacement) of the XOR combiner 49. The ODDN vectors of XORs are each an odd number of XOR gates, operative to be non-bias activated by the Controls of FIG. 6 and to randomly assure that the output of combiner 49 are not 32 bit even number strings, ENSs, each containing an even number of ones.

The Correlation Immunizer, Intermediate Store and non-Linear Combiners, of 170 and 170B, with embodiments described in FIGS. 15A, 15B, 16A and 16B are designed to receive a balanced distribution input and to increase the degrees of correlation immunity and non-linearity of the output strings.

Depending on the mode of operation, the output word of the combiners 170 or 170B, is a (P)Random Mask, and is typically the RNG output, when the Message word input into message combiners 190 or 190B is all zeroes; or is the "running key" mask for SCE encryption or decryption; or the digest mask or an intermediate diffused signature variable for Message Authentication. In preferred embodiments, programmers optionally further mask the RNG output of 170 or 170B with an arbitrary message word in message combiner 190. Feedback unit 400 consists of multiplexers 405 to direct the input to the Feedback Combiner and Store 410. Combiner 410's circuitry is typically similar to Combiner 170's circuitry described in FIG. 15.

The three tiers, 120, 130 and 140 are activated when selected by the Primary Clock. Only the Intermediate and Feedback Stores are activated by the Sample pulse, synchronized to the Primary Clock.

DT8 Control Unit

FIG. 8 is a simplified functional block diagram describing the Top, Middle and Bottom control units 510 operative to drive the tier selects and clock control, the ODDN switches, and the Slip Encoder of FIG. 6. The architecture of the three control units is basically the same, differentiated essentially only by the structure of the three different length many to one nLFSRs 512; (a.k.a., extended length LFSRs, as the all zero stage is now a valid stage in the FSR sequence).

The two internal random triggering devices in the Control Unit are the 3, 5, and 6 celled nLFSRs, 512 implemented in the TOP, MID and BOT Control Units, respectively; and the Random up-Counter 515 which calls for a Slip on the average of once every 9.5 (P)Random Clocks. The random number of clocks between pulses is a function of the status of three cells of the relevant nLFSR 512, and the feedback from the MS output of the relevant TOP, MID or BOT Tier MS cell.

When the 4 bit Counter 515 triggers at count 15, a Right Hand Slip Pulse is emitted to 500 in FIG. 6, if the MS cell output of the relevant nLFSR 512 is a zero; if at the trigger instant, the output of the MS cell output is a one, a Left Hand Slip Pulse is emitted, and also the CONFIG FF 530 changes polarity.

Figure 12:
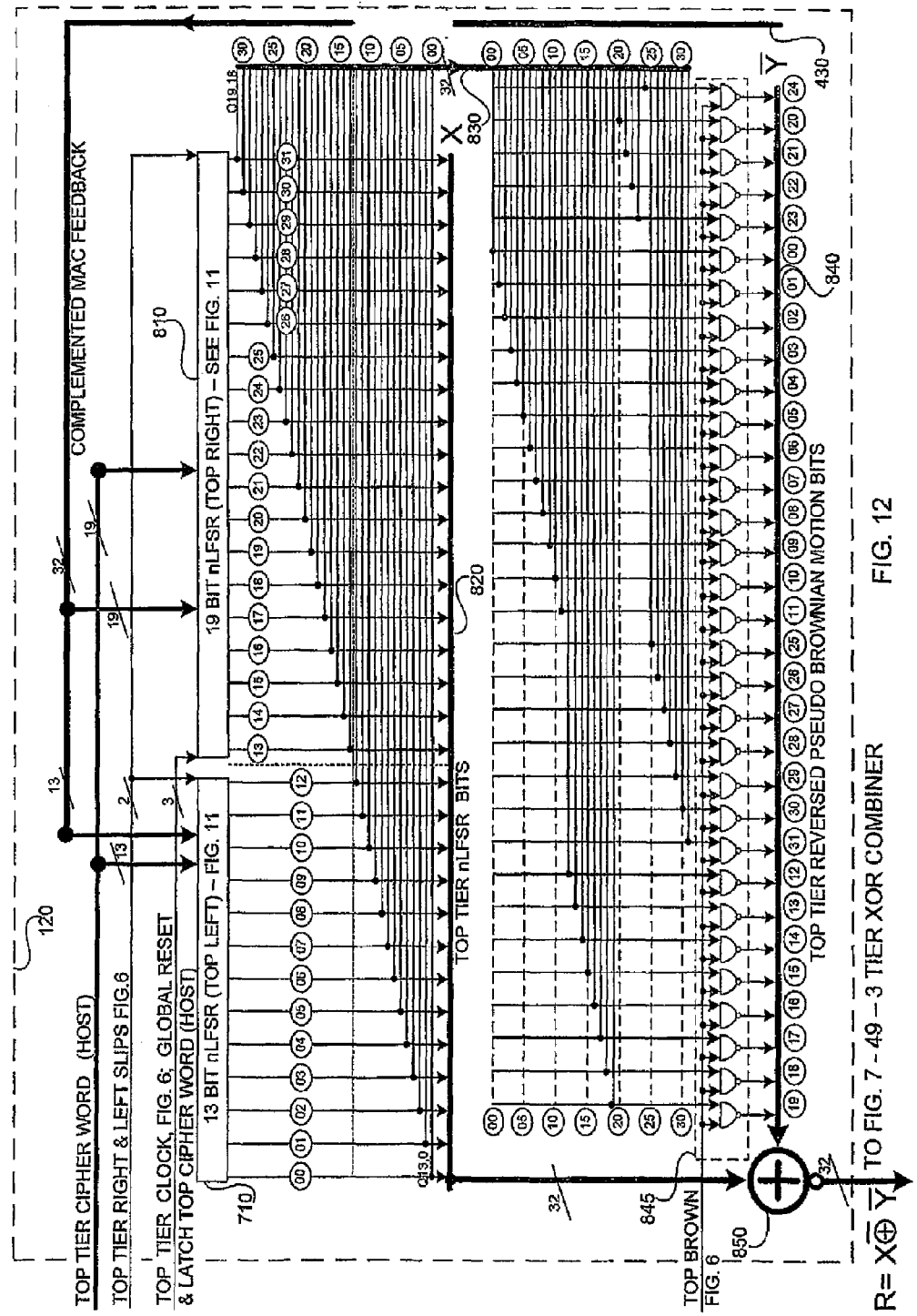
FIG. 12 is a mapping of the Top Tier of 13 and 19 bit nLFSRs output, X vector, into the pseudo-Brownian Y vector, with controls and MAC Feedback.

When the Brownian function 525 is enabled and the ALWAYS BROWNIAN flag is a one, each tier's outputs are auto-XORed with a permuted displacement vector, see FIG. 12. If RND BROWNIAN is enabled, the tier's BROWN function flag 525 is randomly toggled by an output of an internal flip-flop of an nLFSR 512. Bits from the Control Word are loaded into the Control Unit, after Cipher Reset, by the Control Preset Word Load command from the Host. For low cost software deployment, and lowest current consumption hardware implementations, typically, the pseudo-Brownian function is disabled, with the Disable/En Brownian Host setting, or the pseudo-Brownian function is replaced by the Rotate and XOR Tier Output Word.

DT9 Random Hash with ODDN Permute

The Displacement 52 and Odd Number Complementing Permutation Togglers 57 in FIG. 9 show the permutations on the 3 tier XORed word directed by the Johnson Counter Random Stepper 54 of FIG. 10, and the ODDN Selectors 560 from the integrated controller of FIG. 6, and the ODD4 Toggle from AND gate 224 of the (P)Random Clock of FIG. 4.

At each Host prompted Sample command, the Johnson Stepper randomly activates a different displacement permutation vector, A, B, C or D, which redirects the inputs from the 3-tier XOR Combiner 49. Each input bit, Ixx is directed to an output bit, Aaa, Bbb, Ccc or Ddd, wherein the D Vector is a straight through same location output. For example, when the B Vector is activated, input bit I15 is directed to the 21'st output bit; when the A vector is activated, the I11 input bit is connected to the 25'th output bit. The D vector which does not change the bit orientations and is useful for testing/reading the outputs of the Register Bank.

The ODDN selectors are all unbiased permutation complementors, wherein all combinations of the four selects are equiprobable, and circuit diagram 57 is self explanatory. Each ODDN vector complements an odd number of bits, thereby converts an ENS to an ONS, or an ONS to an ENS, and complements 9 or 13 bits of the Matrix permutation. The ODD4 Toggles the bit 4 only. Note that the different selection lines of block 57 correspond to different selectable permutation vectors for permutation unit 50.

DT10 Hash Matrix Random Johnson Stepper

FIG. 10A is a block diagram explaining the mode of operation and the apparatus of the preferred embodiments for random joggling of Hash Vectors A, B, C, and D. FIG. 10B is a state diagram depicting the operation of the joggled Johnson Counter Random Stepper operative to activate the Hash vectors of FIG. 9 in RNG, SCE and MAC modes.

Johnson Counter

A conventional Johnson n Counter is an n-celled shift register, where a "1" rotates from left to right and wraps around interminably. For the deterministic functions, SCE and MAC, the initial condition of the counter 54 is set by the Load Cipher Control Word command, wherein the two bits of the Control Word initial condition is decoded by 54B, to a single moving of the single "1" at each Sample command.

As it is typically beneficial to initiate the RNG mode with all flip-flops in a random state, circuitry has been implemented to force the counter to the 0001 stage, if more than one flip-flop in the Counter 54, 54C of the state diagram, is a "1", F=1; or if the counter is in the all zero state, E=1, and a zero is "forced" into the LS, A bit of the Johnson counter 54. This Self-Start assures that only one Hash vector is operative at a Sample cycle.

Note that stage 55A activates the A Vector, 55B the B Vector, 55C the C Vector and 55D activates the D Vector. At every clock, if the Juggle Hash Toggle signal, V, from FIG. 4 is "0", then the bit in 55D→(progresses to) 55A, 55A→55B, 55B→55C, 55C→55D, 55D→55A . . . etc. However if V=1, then (as J will be "1"), 55A and 55C are "Juggled" such that, 55A→55D, and 55C→55B, as is illustrated in 54A.

DT11 One to Many 13 Bit nLFSR

Figures 11A, 11B:
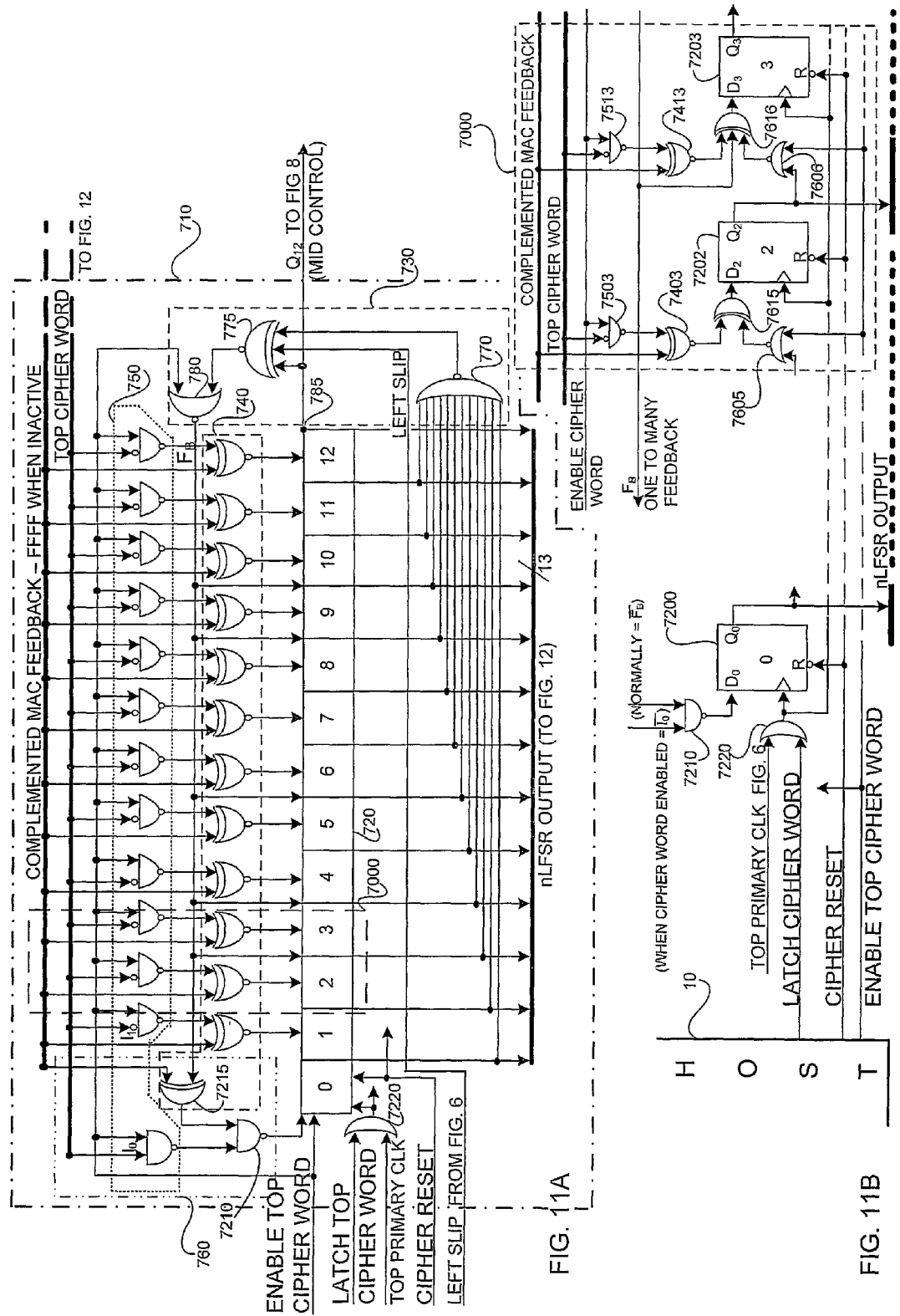
FIGS. 11A and 11B show the typical circuitry of a Multiple Return nLFSR (13 Bit nLFSR of the Top Tier) with mechanism for loading, for processing slip pulses, and to accept optional feedback words.

FIGS. 11A and 11B show the typical architecture of a Multiple Return nLFSR, a.k.a. One to Many nLFSR 760; operative to be loaded with Initial Conditions from a Host 10 in circuit 750; operative to accept a stage modifying Left Slip bit from FIG. 6; operative to receive optional Feedback from Feedback combiner 400, FIG. 14, into XOR vector 740, and enhanced with the NOR extension 770, to assure a balance of ones and zeroes. All 6 nLFSRs, two in each tier, are based on the same architecture, the only difference being the number of cells in the Register, and the Feedback configuration. Components of the Feedback Register 720 are detailed in FIG. 11B.

In the Many-to-One configuration of 760, the feedback assembly 730 regulates the serial feedback bit. The $F_B$ nLFSR feedback is an XOR of the random Left Slip pulse from FIG. 6; the output of the NOR gate 770; and the output of the MS cell 785 the last being the most active of the three signals. The signals are NXORed in gate 775 to generate the complement of the Feedback signal, $F_B$. NOR gate 780 negates the $F_B$ when the Host 10 loads the Top Cipher Word, fed into NXOR vector 740 during the Enable Top Cipher Word command from the Host.

Avoiding "Stuck on Zero"

Normal LFSRs "get stuck on all zero", when all cells of the register are at Zero value, and the MS cell cannot generate a "1" value, to generate a normal sequence. If the all zero value is not included in the total sequence, then a "surplus" of n (the number of cells in the LFSR) ones appear in the resultant full string of $2^{n-1}$ bits.

When NOR gate 770 senses that the 12 LS cells outputs are all zeroes NOR gate 770 generates a one. Normally, the first instant of sensing 12 zeroes, is when the MS cell outputs a one, so that the Feedback bit will be a zero, fed back into the LS cell, operative to cause an all zero parallel output of the Register 720. At the next clock cycle, the MS cell outputs a zero, and the NOR gate 770 again senses 12 zeroes and outputs a one, thereby causing a One to Many "1" feedback, into the feedback taps following cells 2, 3, 5, 8, and 9. (The MS cell's output is also considered a feedback tap.) At this second clock shift, cells 0, 3, 4, 6, 9 and 10 will be complemented to one.

All nLFSRs in the ZK-Crypt are "maximum" length, as all of the $2^n$ bit possible words exist in a normal uninterrupted $2^n$ sequence and are therefore equiprobable.

Note that nLFSR cells are numerated from the LS bit "0" on the left to the MS bit "n−1", on the right.

The feedback signal taps into the TOP tier left hand 13 Bit nLFSR and the right hand 19 bit nLFSR and are XORed at the input/output juncture, e.g., 7616 in 7000, of the following cells:

2, 3, 5, 8, 9 and nominally 12; and 1, 3, 5, 7, 8, 9, 11, 14, 16 and nominally 18; respectively.

The feedback signal taps into the MID(dle) tier left hand 18 Bit nLFSR and the right hand 14 bit nLFSR and are XORed at the input/output juncture of the following cells:

2, 4, 6, 7, 10, 11, 12, 13, 15 and nominally 17; and 1, 4, 5, 8, 10, 13 and nominally 13; respectively.

The feedback signal taps into the BOT(tom) tier left hand 15 Bit nLFSR and the right hand 17 bit nLFSR and are XORed at the input/output juncture of the following cells:

0, 1, 5, 6, 10 and nominally 14; and 1, 4, 7, 9, 10, 12, 13 and nominally 16; respectively.

In FIG. 11B, the three typical cells common to the six nLFSRs are depicted. The LS cell, left hand cell, around D flip-flop 7200 is operative to receive the Feedback signal during normal operation, via NAND gate 7210, which receives the complemented $F_B$ (by the inactive complemented MAC feedback via XOR 7215 FIG. 11A). When the TOP Cipher Word is loaded, the Enable Cipher Word command, selects the vector 750, FIG. 11A, and disables $F_B$ in gate 780, so that gate 7210 is operative to receive the LS Cipher preset bit, relaying $I_0$ to the Data In ($D_0$) input of 7200. When the Host selects a Cipher word, the Host issues a Latch Cipher Word pulse via OR gate 7220, which "clocks" the register 720 flip-flops, thereby latching in the initial Cipher word.

The cell pair 7000 is detailed in FIG. 11B which characterize all nLFSR cells in the Register, (with the exception of the LS cell detailed above). The left hand number 2 cell input is not operative to receive the nLFSR feedback, $F_B$ in XOR gate 7615 and the right hand cell is operative to receive the output from $Q_2$ of flip-flop 7202 XORed to $F_B$ via 3 input XOR gate 7616. NOR gates (shown here) 7605 and 7606 are operative to disable the normal data shift in shift register 720, during loading of the Cipher Word.

NAND gates 7503 and 7513 from input vector 750, FIG. 11A, when selected, relay 12 and 13 input values into NXOR gates 7403 and 7404.

The MAC Feedback value is complemented, when the MAC feedback is active, and is FFFF otherwise.

Output $Q_{12}$, from the MS flip-flop is a random input into the Middle Control Unit's Counter 515 shown in FIG. 8.

DT12 Top Tier XORed FRW-REV Brownian

FIG. 12 is a mapping of the Top Tier 120 with concatenated 13 and 19 bit nLFSRs, see FIG. 11, with output X vector 820, scrambled the pseudo-Brownian Y vector 840, with local controls, MAC Feedback vector 430, and the Cipher Key Word Load word from the Host 10. The architecture of the Top Tier 120 is identical to the architecture of the Middle Tier 130, and the Bottom Tier 140; the difference being the feedback configuration of the nLFSRs, described in the previous section, and the Pseudo-Brownian vectors, described in the Glossary.

Initial key values, necessary for the deterministic functions, the SCE and the MAC, are downloaded from the Host 10 after Cipher Reset, and locked in place with the Cipher Preset command, for key lengths of 128 and less. Maximum length key loading is typically accomplished using the MAC Feedback mode wherein at least ten 32 bit key words are digested after Cipher Reset, and prior to the Cipher Preset command, to establish initial conditions in the native and obscure internal variables.

Tiers are "clocked" subject to the mode strategy. In the preferred Single Step mode, a seemingly random tier is stepped on the same clock as a Sample. In other preferred embodiments the three tiers are simultaneously activated.

Using the Wait and Sample command, either single tiers are randomly activated or all three tiers are activated for a predetermined number of cycles prior and while the last clock executes the Sample.

The nLFSRs in the One-to-Many configuration, when observed at each shift, have a "feeling" of movement from left to right, disturbed, randomly when a feedback complements "betwixt" XOR gates. Tests detected a correlation between the output and the movement. Past practice has revealed that the Slip displacement command occasionally causes a small bias on one or two of the output bits. XORing two slightly biased bits asymptotally removes the bias close to nil, whereas if one of the bits is unbiased, the result is totally unbiased.

The Pseudo-Brownian vectors of the three tiers were engineered to have a mapping of two to one or four to one. e.g., if all of the $2^{32}$ 32 bit values which are equiprobable on the X vector are XORed to the Y vector, there will be $2^{31}$ (2 to 1 mapping) or $2^{30}$ (4 to 1 mapping) different R vector results, each appearing twice or four times respectively, in the full sequence.

Random (1 to 13 bit) clusters of input vector X, 820, reverse their direction, e.g., cluster ($x_{20}$, $x_{21}$, $x_{22}$, $x_{23}$) becomes "mirrored" cluster ($y_{23}$, $y_{22}$, $y_{21}$, $y_{20}$), wherein these mirrored clusters are disbursed randomly, in Y, such that a pseudo single "backward" oriented directional random Brownian type motion flows in the reverse direction to the forward oriented moving bit values in the nLFSRs. This new orientation effectively decreases the correlation between the input (the concatenated output of 710 and 810) and the XORed in 850 output of 820 and 840, e.g., bits 12 to 19 from Vector X are mirrored and are bits 00 to 08 of Vector Y, such that:

bit $y_{00}$ is XORed to bit $x_{19}$;

bit $y_{01}$ is XORed to bit $x_{18}$;

bit $y_{02}$ is XORed to bit $x_{17}$;

bit $y_{03}$ is XORed to bit $x_{16}$; etc. into vector output R.

The Y vector of 120 is activated when the Top Brown command from FIG. 6 is a one, wherein the NAND vector 845 complements the Y vector value. The NXOR vector 850, outputs the true value of R=X⊕Y, when the 845 is active, else, R=X. R is always a valid string and XORed to the result vectors of the Middle and Bottom tiers 130 and 140 of FIG. 2, irrespective if the tiers are clocked or static.

DT13-DT14

Figure 13:
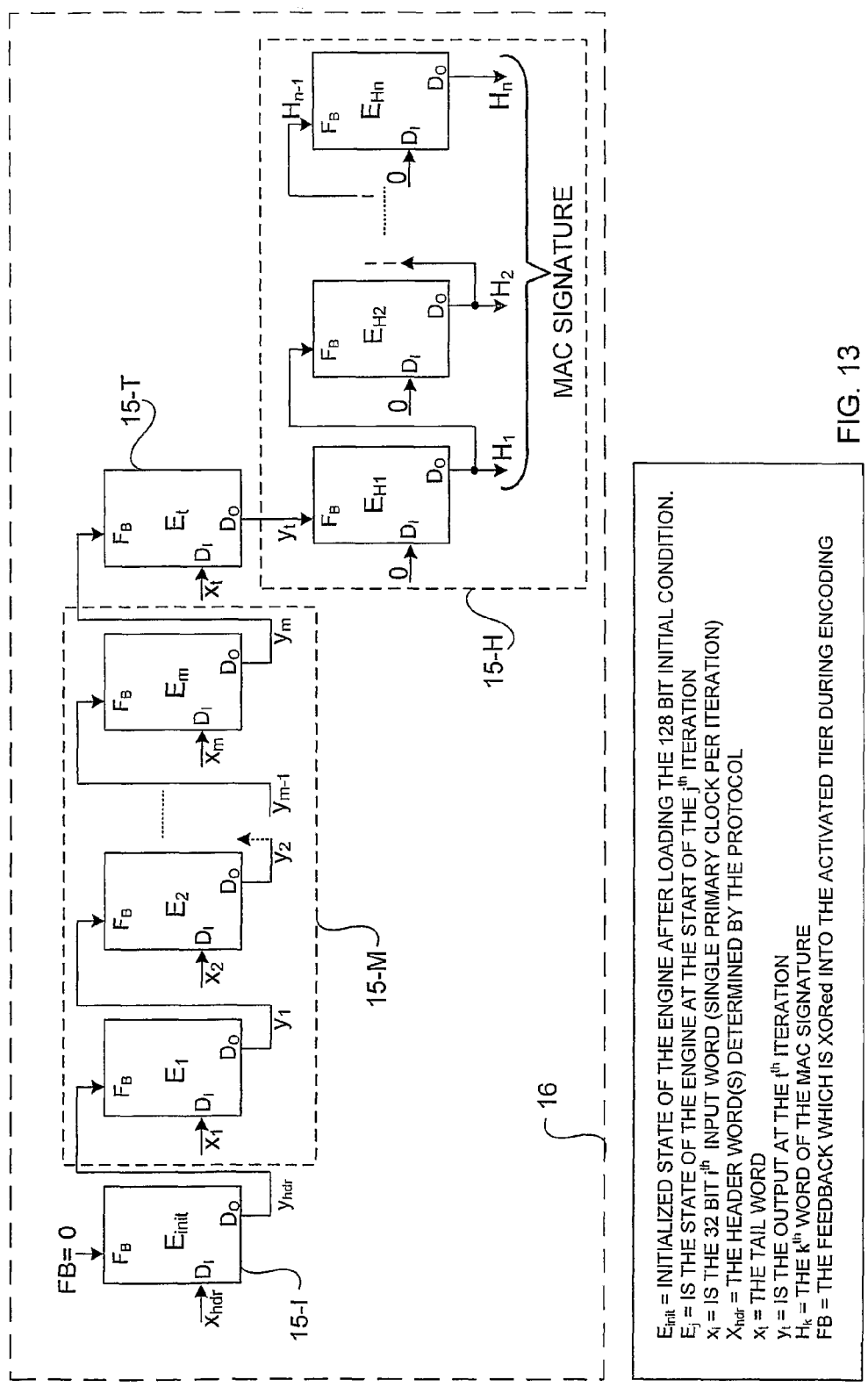
FIG. 13 demonstrates the chaining of the MAC message inputs into the E stages of the Hash digest, and the unchanged signature sequence.

FIG. 13 is a state diagram depicting the stages of a preferred embodiment of the Message Authentication Coding apparatus and method of this invention.

Figure 14:
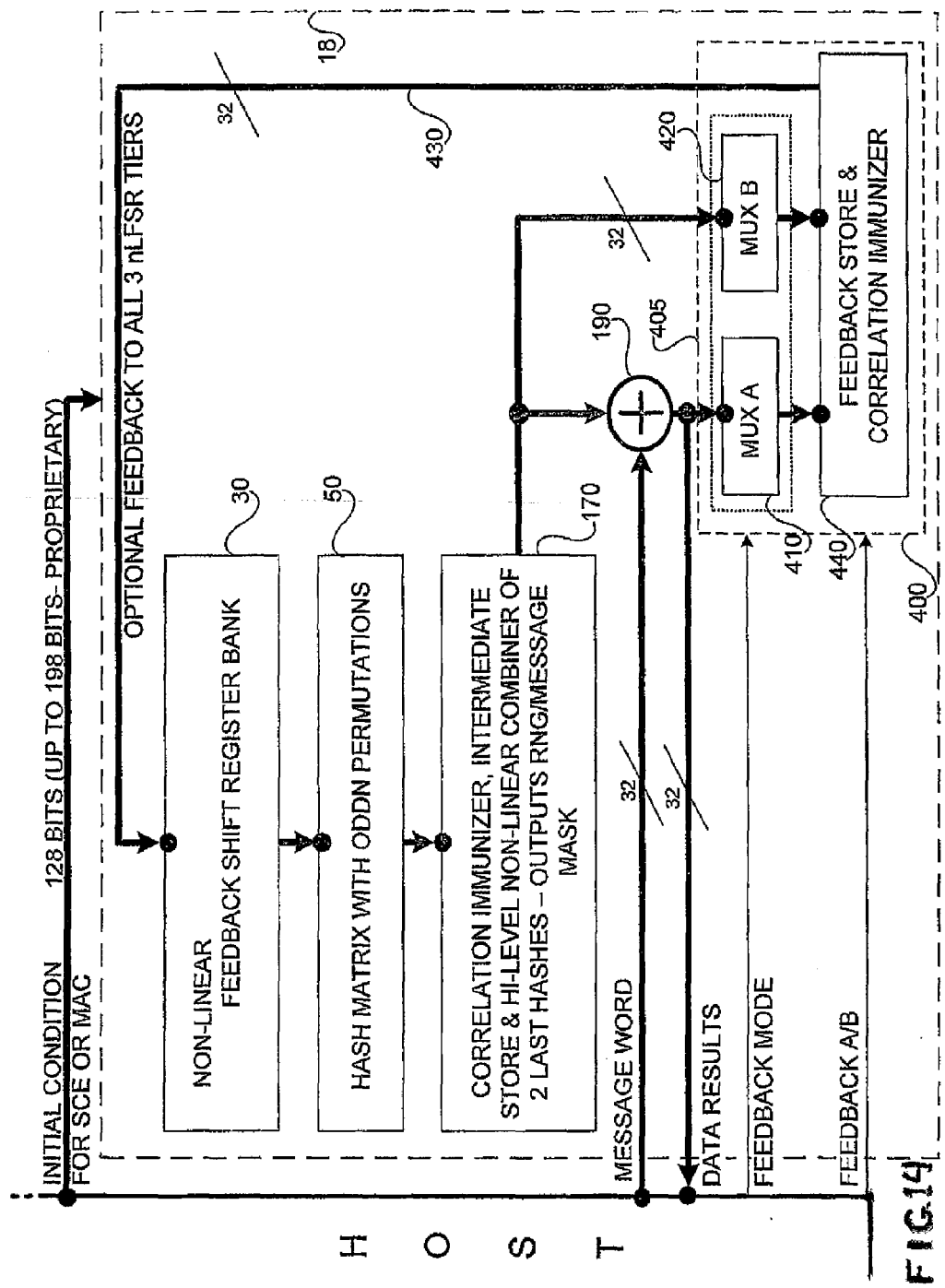
FIG. 14. is a block diagram describing the optional Feedback configuration options for Random Number Generation and Stream Ciphering, and the digested Message Feedback operative in Message Authentication Coding.
Figure 15A:
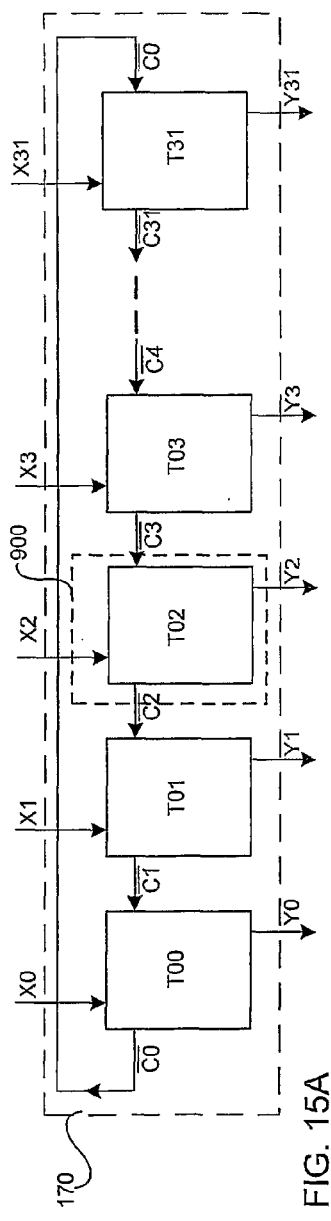
Figure 15B:
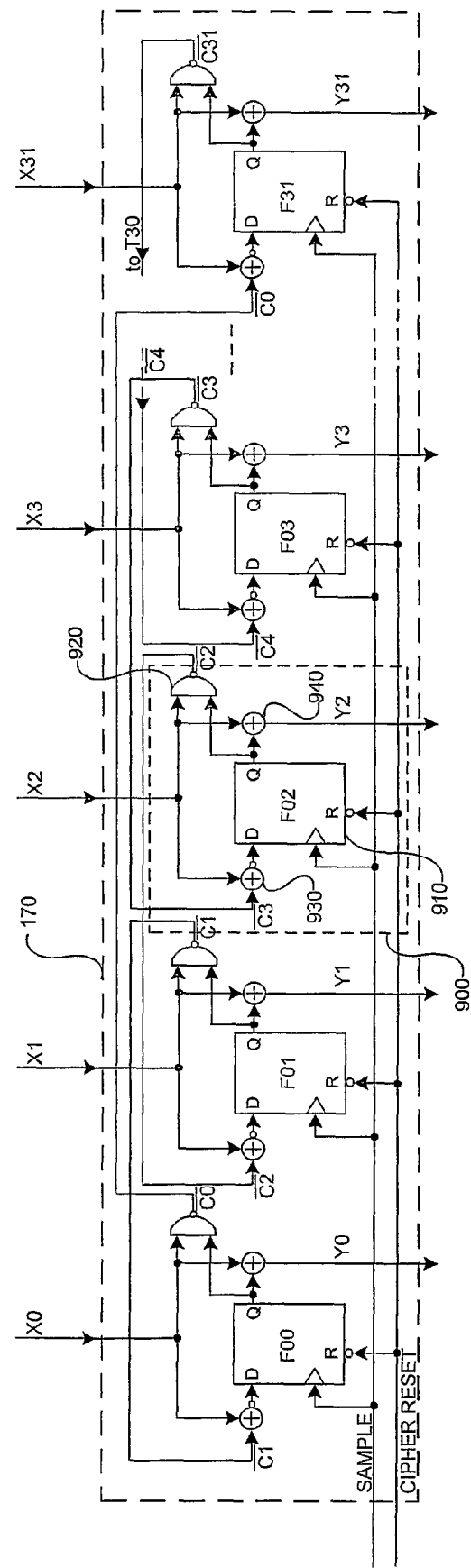

FIG. 14 is a block diagram of the interacting modules configuration in a Feedback mode, the most important of which is the MAC validation mode charted in the sequence of FIG. 13.

The Blocks, $E_j$ depict the state of the ZK-Crypt Engine 18 at instances j. At initialization state, $E_{init}$, typically the Register Bank and the Obscure variables are set to a typically standard system condition.

Secret-Key MAC Signatures

For secret keyed authentication, wherein, a secret key initial condition is known to the Host 10 of Engine 18 and typically, only the Host and/or another device are privy to the secret key, and are able to authenticate a secret keyed MAC signature.

For a system standard keyed authentication, wherein, the system key initial condition is known to the Host 10 of Engine 18 typically, any same system Host is privy to authenticate a system keyed MAC signature.

In a preferred embodiment Engine State, $E_{init}$, 15-I, the initial condition in 18 is achieved typically by:

a) executing the Cipher Reset Command to reset or set all flip-flops to a known value, b) setting the Sample Delay Vector to equal the number of Register Bank activations to be exercised between authentication digests, when operated in the Wait and Sample mode of operation, c) optionally loading the native variables in the control word (shown in FIG. 2) and the 3 tiers, 30, optionally only Cipher Reset and Cipher Preset are sufficient to initialize MAC variables, d) setting the engine to MAC Feedback mode activated by MUX A, 410 to diffuse the bits of the Message word via the Feedback Loop, into the Feedback Store, and into the native and obscured flip-flop variables, e) enable the Synch Counter, f) for maximum diffusion, disabling Single Tier Select, enable TOP, MID, and BOT TIER ALWAYS, FIG. 6 or optionally, for lower power consumption, enabling Single Tier Select which is operative to randomly activate (clock) tiers, (only a clocked tier inputs Combiner 440's output), g) execute a Cipher Preset, operative to Reset the Synch Counter and to latch in the Sample Delay Vector, to latches in an initial word into Combiner 170, h) move the header word, $x_{hdr}$, into the Host message port, for $x_{hdr}$ to reside in message combiner 190, Di in the drawings, the header word, $x_{hdr}$, typically includes the value m, the number of words in the message, i) execute a Sample or a Wait and Sample command to finalize $E_{init}$; wherein the Message word is XORed to the Mask output of the Intermediate Combiner 170, outputting internally $y_{hdr}$ via MUX A 410 into the data input of Feedback Store and Correlation Immunizer 440 of FIG. 14 to be sampled at the next step, via Feedback vector output 430 and diffused into the active tiers or tier in the Register Bank 30.

Block 15-M is the message digest phase, where at each state from $E_1$ to $E_m$:

a) message words from $x_1$ to $x_m$ are moved to the Host output port b) at each word, either of the Sample or the Wait and Sample command is executed, operative to diffuse each MAC Feedback word into the Register Bank, into the Intermediate Combiner and into the Feedback Combiner.

Block 15-T is the tail digest phase wherein the tail word, $x_t$, typically includes the value m which can be read on the Synch Num Out Host input vector from the Mask Synch and Page Counter, 320, FIG. 5, whence:

a) message word $x_t$ is moved to the Host output port, b) a single Sample or Wait and Sample command is executed, operative to diffuse the tail word into the Feedback Combiner then:

at the first step of the MAC Signature phase, 15-H:

a) reset the Host output port, (to zero the Message input, $D_j$, in message combiner 190), then for n steps, b) execute a Sample or a Wait and Sample command to generate n MAC Signature words, $H_1$ to $H_n$, to be read by the Host on the Data Results output, FIG. 14, from the Intermediate Combiner 170, outputting internal signature words via MUX A 410 into the data input of Feedback Store and Correlation Immunizer 440 of FIG. 14 to be sampled at the next step, via Feedback vector output 430 and diffused into the active tiers or tier in the Register Bank 30 to attain maximum diffusion of the Message digest.

In the preferred Message Authentication Coding embodiments, the number of 32 bit digested words is included in the header word, $x_{hdr}$ of the digest, and in the last tail word $x_t$, wherein $x_t$ is generated by the Mask and Page Synch Counter, regulated by a fixed or frozen protocol, to automatically read the Mask and Page Synch Counter output, diffusing said count value into the native and obscure variables, thereby limiting the number of the number of collision combinations that an adversary is typically capable of generating.

Multiplexer A inputs a Hash digest (including the Message Word) for MAC mode feedback, and is an option for additional RNG complexity.

Multiplexer B, is typically useful for adding complexity to SCE military encryption, and/or for added complexity for random number generation.

DT15 & DT16 Single/Dual Saved Carries in Non-Linear Combiners

FIGS. 15A, 15B, and 16A and 16B are block and circuit diagrams depicting correlation immunizing and non-linear combiners, found in preferred embodiments of the Intermediate Combiners 170 and 170B and optionally in the Feedback combiner 440. The simplest non-linear function is the AND product of two binary digits, $x_1$ and $x_2$, equal to $x_1 x_2$. In the preferred embodiments the carry bits quickly become high order time dependent non-linear variables. Each carry saved input, standing alone, has a 25% probability of complementing one of the input XOR sums of Hash/ODDN outputs X0 to X31 of FIGS. 15A, 15B, and 16A and 16B; the sum consisting of the two last $X_j$ bits.

FIG. 15 is a combiner with memory and a pseudo half adder single saved carry interaction. FIGS. 16A and 16B depict a pseudo three input full adder with double carry save.

FIG. 15 demonstrates a preferred embodiment for combining unbiased balanced distribution Sampled L bit length binary words, at Sample instants t=0 to t=i, wherein the input bit to the $T_j$'th interconnected transformation cell, at Sample time, m, $X_{j(t=m)}$, is permuted to transmit a product carry bit, $C_{j(t=m)}$ to the $T_{j-1 \, mod \, L}$ transformation cell, operative to output $Y_{j(m)}$, of the m'th output word, with correlation immunity in the concatenated string sense, and increased non-linearity comprising:

inputting a sequence of seemingly random words into the transformation cells, wherein at the i'th word instant, inputting the assumed statistically unbiased bit $X_{j(t=1)}$, into the j'th bit location where the bit memory cell, $T_j$, which stores the previous $X_{j(t=i-1)}$'th binary value XORed to the previous input product carry bit, $C_{j+1(t=i-1)}$, from the $T_{j+1}$'th, previous cell to be XORed with the $X_{j(t=i)}$'th value to produce the $Y_{j(t=i)}$'th output transform of the i'th input word, and to generate the product carry out bit $C_{j(t=1i)}$ to be transmitted to the $T_{j-1}$'th cell, where the carry out bit, $C_{j(t=i)}$, is the product of the stored value, $C_{j+1(t=i-1)} + X_{j(t=i-1)}$, and the present input value $X_{j(t=i)}$ so that for positive j and t values, j=j mod L and t=t mod L:

$$Y_{j(t=i)} = X_{j(t=i)} + (X_{j(t=i-1)} + C_{j+1(t=i-1)}),$$

where the carry from the right hand cell, $C_{j+1(t=i-1)}$, at the previous instant is:

$$C_{j+1(t=i-1)} = X_{j+1(t=i-1)}(X_{j+1(t=i-2)} + C_{j+2(t=i-2)})$$

and where i≧3, typically after the initialization procedure:

$$C_{j+1(t=i-1)} = X_{j+1(t=i-1)} \, X_{j+1(t=i-2)} + X_{j+1(t=i-1)}$$
$$C_{j+2(t=i-2)} = X_{j+1(t=i-1)} \, X_{j+1(t=i-2)} + X_{j+1(t=i-1)}$$
$$[X_{j+2(t=i-2)}(X_{j+2(t=i-3)} + C_{j+3(t=i-3)})];$$

and for the general case where i≧3:

$$Y_{j(t=i)} = X_{j(t=i)} + (X_{j(t=i-1)} + \{(X_{j+1(t=i-1)} X_{j+1(t=i-2)}) + X_{j+1(t=i-1)}[X_{j+2(t=i-2)}(X_{j+2(t=i-3)} + C_{j+3(t=i-3)})]\}$$

wherein all $X_{k(t\geq 0)}$ binary values are assumed unbiased, such that the probability of a "1" product of z random $X_{k(t>0)}$ values is $2^{-z}$. The probability of a "1" carry-in binary bit is obviously ¼, but does not change the statistics of the probability of the output bit; but does contribute increasingly high order non-linear variables.

The Carry rule for FIG. 15 is simply, Carry $C_{j(t=i-1 \, mod \, 32)}$ is input into cell $T_{j-1(t=i \, mod \, 32)}$ and is summed to input $X_{j(t-i \, mod \, 32)}$.

In the Double Carry configuration of FIG. 16, Carry $C_j$ is input into both $T_{j-1 \, mod \, 32}$ and also to $T_{j+3 \, mod \, 32}$.

Noting that the conventional sign ⊕ is used for XOR, and the plus (+) sign for OR, $Y_{j(t=i)}$, $X_{j(t=i)}$ and $C_{j(t=i)}$ are the j'th bit values at the i'th Samplings the output, the input and the internal carry outputs, respectively and:

$Y_{j(t=i)} = X_{j(t=i)} \oplus + (X_{j(t=i-1)} \oplus + (\text{Sum of Carries})$ where the:

Sum of Carries=$(C_{j+1(t=i-1)} + C_{j-2(t=i-1)})$. The probability of the Sum of Carries, affecting the output of $Y_{k(t=i)}$, for all balanced $X_k$ inputs is the probability of the Sum of Carries being a "1", where the probability of a "balanced" carry bit being "1" is 0.25:

| 4-$(C_i + C_j)$ Samples | Probability of i'th input | Probability of j'th input | Output Bit$_i$ + Bit$_j$ | Probability of a "0" Output | Probability of a "1" Output |
|---|---|---|---|---|---|
| 0 + 0 | 0.75 | 0.75 | 0 | 0.5625 | |
| 0 + 1 | 0.75 | 0.25 | 1 | | 0.1875 |
| 1 + 0 | 0.25 | 0.75 | 1 | | 0.1875 |
| 1 + 1 | 0.25 | 0.25 | 1 | | 0.0625 |

Therefore the average that the Sum of Carry's output will be a "1" bit and will complement the exclusive OR sum of the input bits is typically 0.4375.

The combiners of FIGS. 15 and 16, 170 and 170B each consist of 32 $T_{xx}$ cells, $T_{00}$ to $T_{31}$. The circuits of cells 900 and 900B are depicted in FIGS. 15B and 16B. In 900 the complement of Carry bit from $T_{03}$ is input to NXOR gate 930 and in 900B the complement of Carry bit from $T_{03}$ and the complement of Carry bit from $T_{31}$ is input to NXOR gate 930B. When a Sample pulse activates flip-flops F02, in FIGS. 15 and 15B, the outputs of 930 and 930B respectively are the new outputs at the respective Q output of the F02 flip-flops. At the sample instant the next binary value $X_2$ and the Q output are XORed by 940 and 940B to generate a new $Y_2$ output. The Complemented Carries 920 and 920B are input into the T01 cell, and the Carry 920B is also input into the T05 cell.

The Intermediate Store combiners 170 and 170B, serve as the RNG output and the Mask for SCE, and also as the Feedback store combiner, principally for the MAC.

The original design, before adaptations for software implementations, specified combiners 190, FIG. 2 and feedback store, 400 without the carry save signals. Such units passed the DieHard suite tests exceptionally well. When the simple combiner was replaced the 400 correlation immunizing combiner, the DieHard results were unsatisfactory. In preferred embodiments combinations of modules are typically chosen to be compliant with DieHard, typically with the knowledge that the input to the correlation immunizers had a high level of uncertainty.

It is appreciated that the particular embodiment described is intended only to provide a detailed disclosure of the present invention and is not intended to be limiting. It is also to be appreciated that the particular embodiments may be implemented in desired combinations of hardware, software and firmware.

The invention claimed is:

1. A random number generating system for generating a random output word sequence and comprising:
   a register bank having a first plurality of register tiers each comprising at least one non-linear feedback shift register (nLFSR), wherein, in each of a multiplicity of iterations, at least one of said tiers generates: a first word which replaces any first word generated by that tier in a previous iteration, a second word comprising a displacement of said first word, and a third word comprising an XOR of the first and second words, and an output word comprising a selected one of the first and third words;
   a combiner which, in each iteration, receives said output words generated by the first plurality of tiers and combines said output words into a single binary word; and
   a data churn receiving said single binary word generated by said combiner and operative, other than in at least one initial iteration, to generate a data churn output word comprising an XOR of an input word, which is a function of said single binary word, with the data churn output word of a previous iteration.

2. A system as in claim 1 and also comprising at least one tier-associated random number generator randomly determining whether a corresponding tier from among said first plurality of tiers does or does not generate a first word to replace a first word from a previous iteration.

3. A system as in claim 1 wherein said data churn comprises at least one hash displacement matrix operative to scramble a function of said single binary word received by said data churn.

4. A system as in claim 1 wherein, other than in at least one initial iterations, said data churn output word generated by said data churn comprises an XOR of said input word, said data churn output word of a previous iteration, and a nonlinear combination of at least a portion of said data churn output word of the previous iteration.

5. A system according to claim 1 wherein said input word XORed by the data churn comprises, in at least one iteration, said single binary word received from said combiner.

6. A system according to claim 1 and wherein said data churn is operative to perform a stream ciphering function by XORing said data churn output word with a message thereby to generate a message-XORed word.

7. A system according to claim 1 wherein said data churn is operative to perform a message authentication function by:
   XORing said data churn output word with a message, thereby to generate a message-XORed word, and
   feeding said message-XORed word to at least one tier and wherein said tier is operative to generate said first word, in at least one iteration, as a function of said message-XORed word.

8. A system as in claim 1 wherein, in at least one iteration, said data churn is operative to feed said data churn output word into at least one tier and wherein, in at least one iteration, said tier is operative to generate said first word as a function of said data churn output word.

9. A system according to claim 1 comprising at least two random processes including a first random process which decides whether an individual tier generates a new first word in an individual iteration and a second random process which decides whether the output of an individual tier comprises its first word or its third word, wherein said system comprises at least one random clocking device driving said random processes.

10. A system as in claim 9 wherein the at least one random clocking device is activated by an autonomous unpredictable oscillator.

11. A system according to claim 1 wherein said data churn comprises a second plurality of toggle signals which each, in at least one iteration, respectively toggle a respective non-overlapping subset of a set of bits which is a function of the input word, thereby to generate a toggled word, and wherein said input word XORed by the data churn comprises, in at least one iteration, said toggled word.

12. A system as in claim 11 and also comprising a second plurality of random toggle signal generators randomly generating said second plurality of toggle signals.

13. A method for generating a random output word sequence, the method comprising:

providing a register bank having a first plurality of register tiers, each comprising at least one non-linear feedback shift register (nLFSR) and generating at least one output word, wherein, in each of a multiplicity of iterations, at least one of said tiers generates: a first word which replaces any first word generated by that tier in a previous iteration, a second word comprising a displacement of said first word; a third word comprising an XOR of the first and second words, and an output word comprising a selected one of the first and third words;

combining said at least one output words generated by the first plurality of tiers in each iteration, into a single binary word; and other than in at least one initial iteration, generating a data churn output word comprising an XOR of an input word, which is a function of said single binary word, with the data churn output word of a previous iteration.

* * * * *

UNITED STATES PATENT AND TRADEMARK OFFICE
CERTIFICATE OF CORRECTION

| | |
|---|---|
| PATENT NO. | : 7,827,223 B2 |
| APPLICATION NO. | : 11/578909 |
| DATED | : November 2, 2010 |
| INVENTOR(S) | : Carmi David Gressel et al. |

It is certified that error appears in the above-identified patent and that said Letters Patent is hereby corrected as shown below:

Col. 6, Line 32
  Delete "andlor"
  Insert --and/or--

Col. 39, Line 5
  Delete "12 and 13"
  Insert --I2 and I3--

Col. 41, Line 2
  Delete "Di"
  Insert --DI--

Col. 42, Line 22
  Delete "Xj(t=1)"
  Insert --Xj(t=i)--

Col. 43, Line 1
  Delete two instances of "+"

Col. 44, Line 4
  Delete "chum"
  Insert --churn--

Signed and Sealed this
Eighth Day of November, 2011

David J. Kappos
*Director of the United States Patent and Trademark Office*